United States Patent [19]
Bigelow et al.

[11] 3,914,578
[45] Oct. 21, 1975

[54] APPARATUS FOR AND METHOD OF AUDITING BUSINESS RECORDS

[75] Inventors: Arthur G. Bigelow, Dublin; Wilbur W. Bigelow, Plesanton; Gale E. Stone, Sunnyvale, all of Calif.

[73] Assignee: Checkpoint Systems, Inc., Hayward, Calif.

[22] Filed: July 19, 1973

[21] Appl. No.: 380,896

[52] U.S. Cl. ................. 235/61.7 R; 235/61.7 B; 235/61.11 E; 250/570; 340/146.3 Z
[51] Int. Cl.² ................. G06K 7/10; G06K 19/06
[58] Field of Search ... 235/61.7 R, 61.7 B, 61.11 D, 235/61.12 M, 61.12 N, 61.11 R, 61.11 E, 235/61.1; 340/147 LP, 174.1 G, 146.3 Z; 88/24; 250/570

[56] References Cited
UNITED STATES PATENTS

| | | | |
|---|---|---|---|
| 2,482,242 | 9/1949 | Brustman | 250/570 |
| 2,820,907 | 1/1958 | Silverman | 250/570 |
| 3,124,674 | 3/1964 | Edwards | 235/61.1 |
| 3,216,317 | 11/1965 | Nail | 88/24 |
| 3,237,164 | 2/1966 | Evans | 340/147 LP |
| 3,268,865 | 8/1966 | Berkin | 340/146.3 Z |
| 3,444,517 | 5/1969 | Rabinow | 340/146.3 Z |
| 3,457,392 | 7/1969 | Dick | 235/61.11 R |
| 3,513,298 | 5/1970 | Riddle | 235/61.11 D |
| 3,514,770 | 5/1970 | Parken | 340/174.1 G |
| 3,527,927 | 9/1970 | Bijleveld | 235/61.11 E |
| 3,594,581 | 7/1971 | Yamashita | 250/570 |
| 3,602,695 | 8/1971 | Boss | 235/61.7 B |
| 3,610,889 | 10/1971 | Goldman | 235/61.7 B |
| 3,610,893 | 10/1971 | Clark | 235/61.11 E |
| 3,697,729 | 10/1972 | Edwards | 235/61.7 B |
| 3,737,629 | 6/1973 | See | 235/61.11 E |
| 3,740,530 | 6/1973 | Hoffer | 235/61.7 B |
| 3,775,594 | 11/1973 | Pasieka | 235/61.11 E |

*Primary Examiner*—Daryl W. Cook
*Assistant Examiner*—Robert M. Kilgore
*Attorney, Agent, or Firm*—Jack M. Wiseman

[57] ABSTRACT

Apparatus for and method of auditing document numbers from sequentially numbered documents such as business records which includes a scanner for sensing numerics printed on a sales slip or guest check, a memory for receiving and storing a block of numbers associated with a block of such sales slips or guest checks, circuitry for removing from memory a particular guest check number when the guest check is received for payment of the transaction, and a printer for displaying the guest check numbers remaining in memory. In operation, when a block of guest checks which are sequentially numbered have been assigned to the employee of an establishment at the beginning of the business day, the guest checks having the lowest number and the highest number of the assigned block are scanned and the respective numbers printed thereon are stored. The apparatus initiates a count beginning with the lowest number entered and terminating with the highest number entered and stores all of such numbers from the lowest to the highest in the memory. Thereafter, when a guest check is entered into the scanner at a time when payment is received thereon, the number printed on that guest check is removed from memory. Whenever it is desired to determine which guest checks have not been received from the particular block which has been issued, the apparatus can be actuated to provide a print out of the numbers remaining in memory. Also disclosed is a coded member corresponding to a numeric character which has a plurality of pattern portions, one for each half of a horizontal line of a character in a block form, and a pattern portion for an index mark associated with such a character. A scanner is also disclosed for reading such a coded number.

16 Claims, 29 Drawing Figures

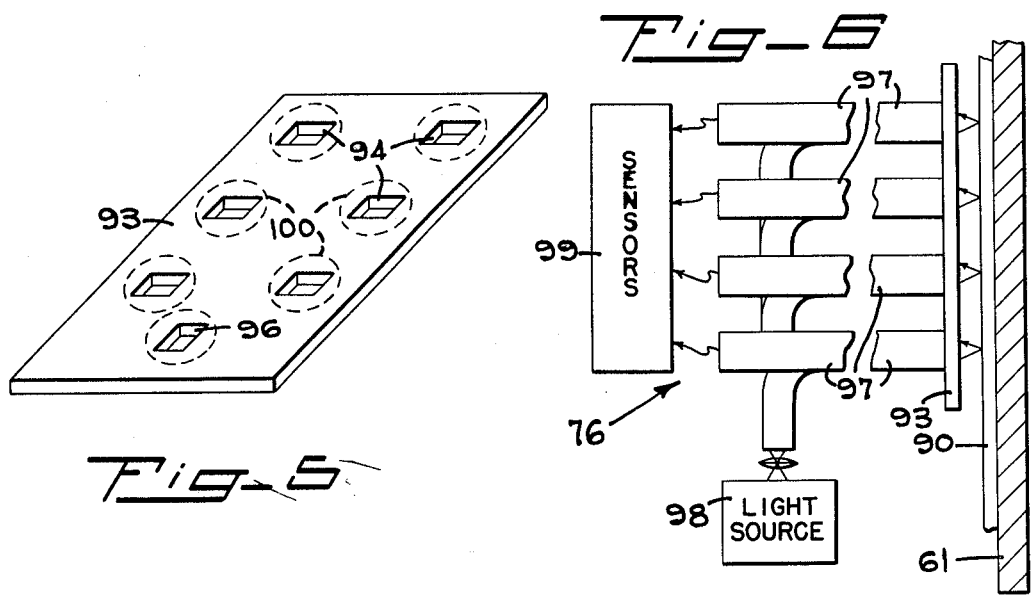
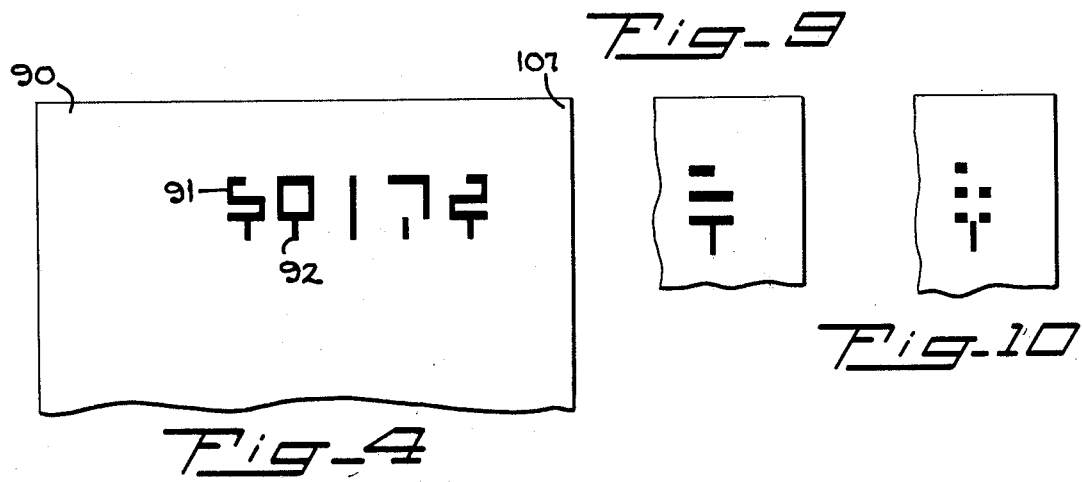
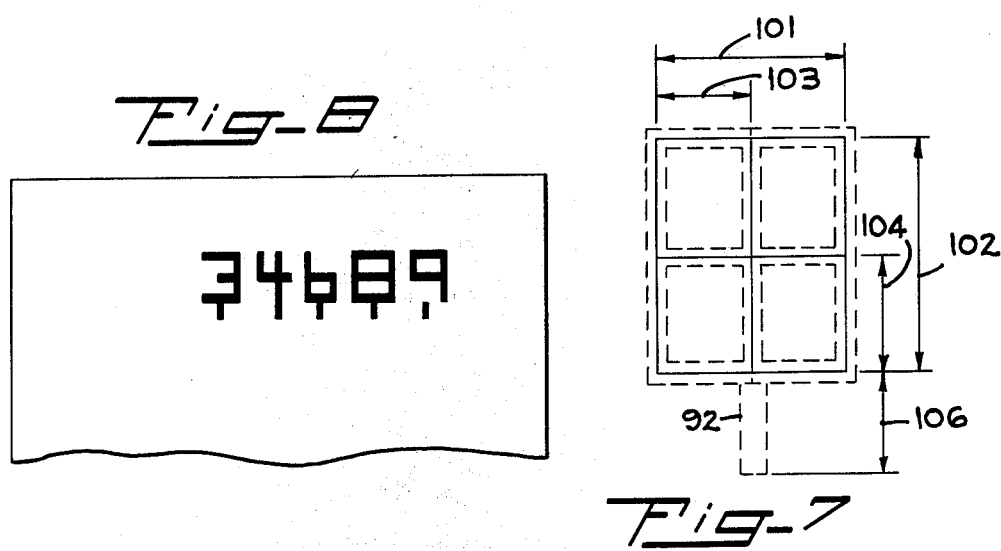

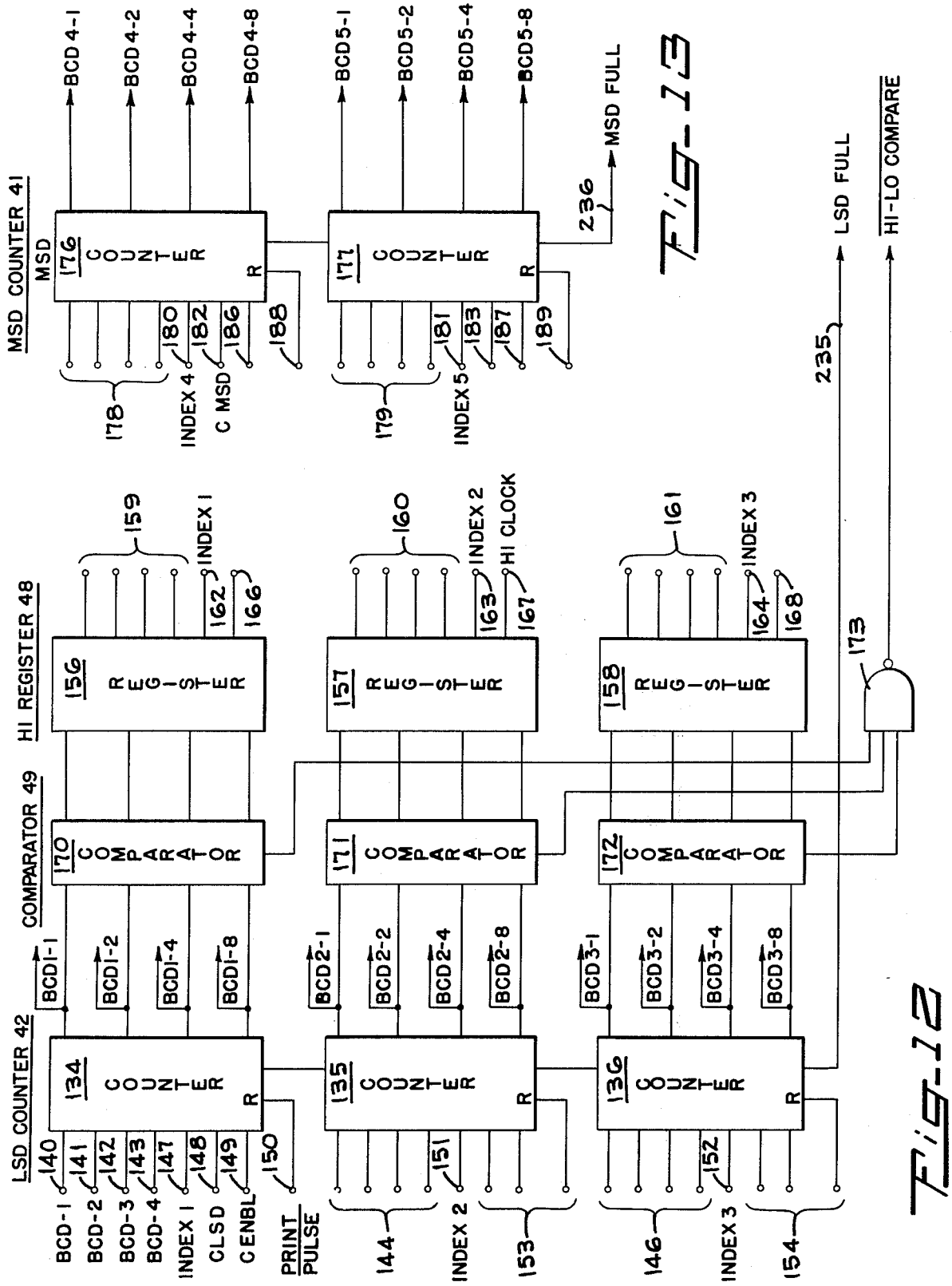

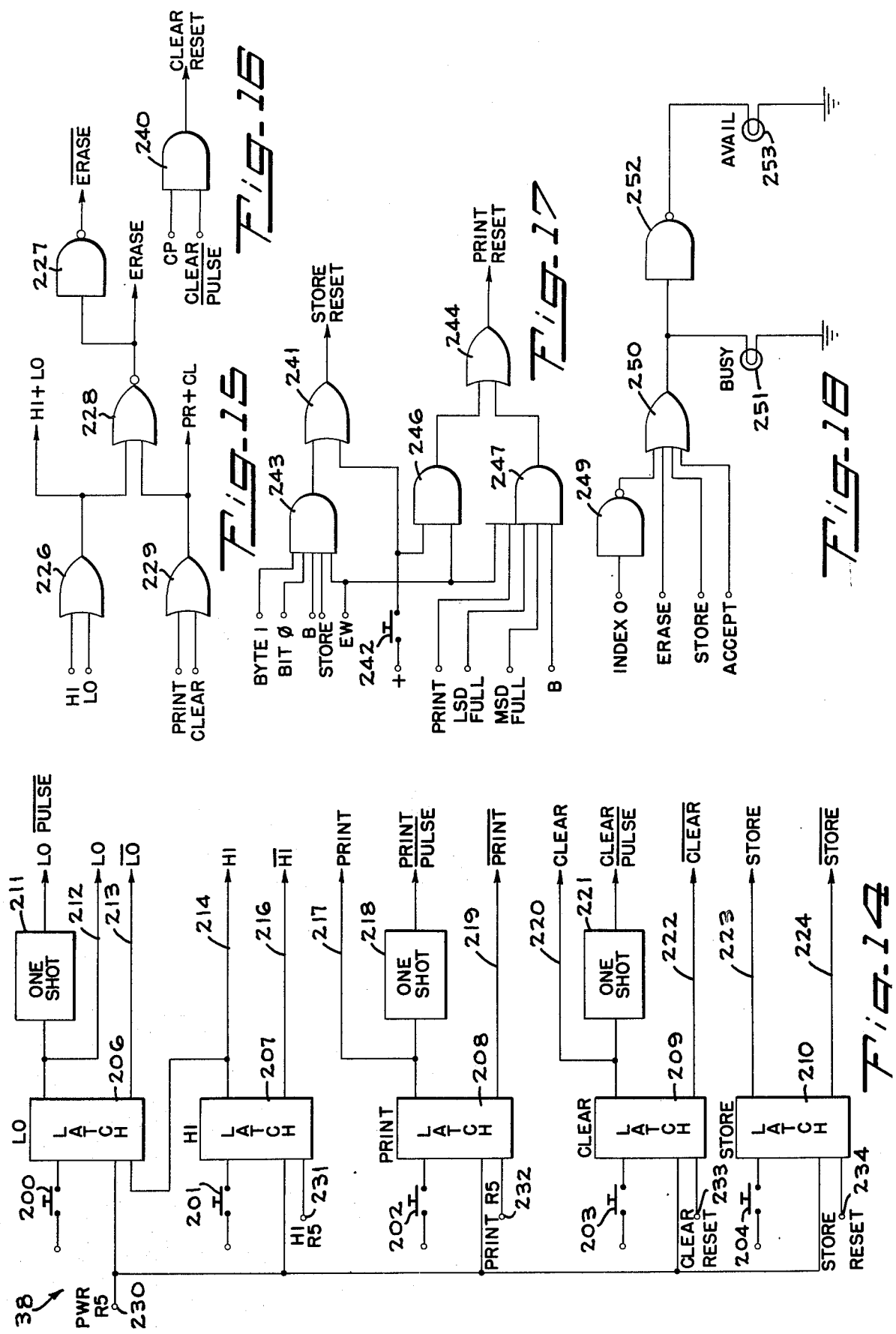

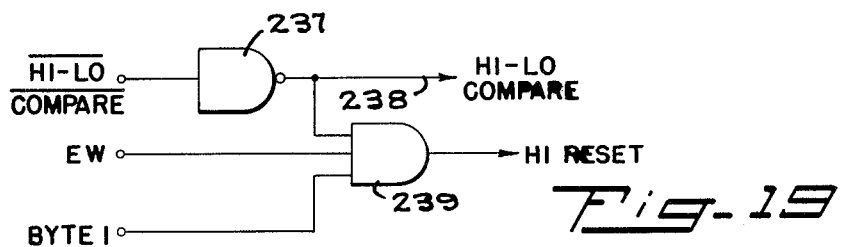
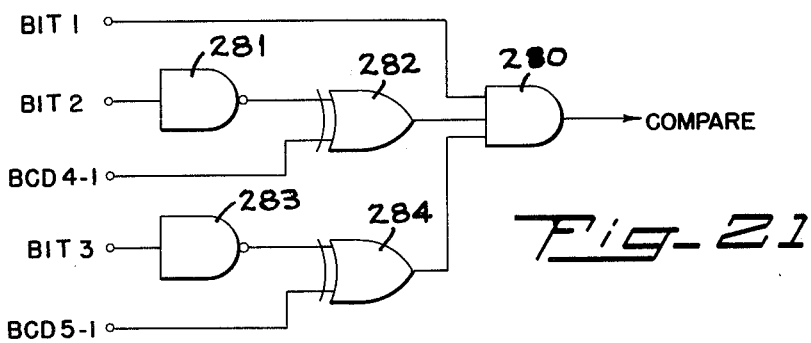
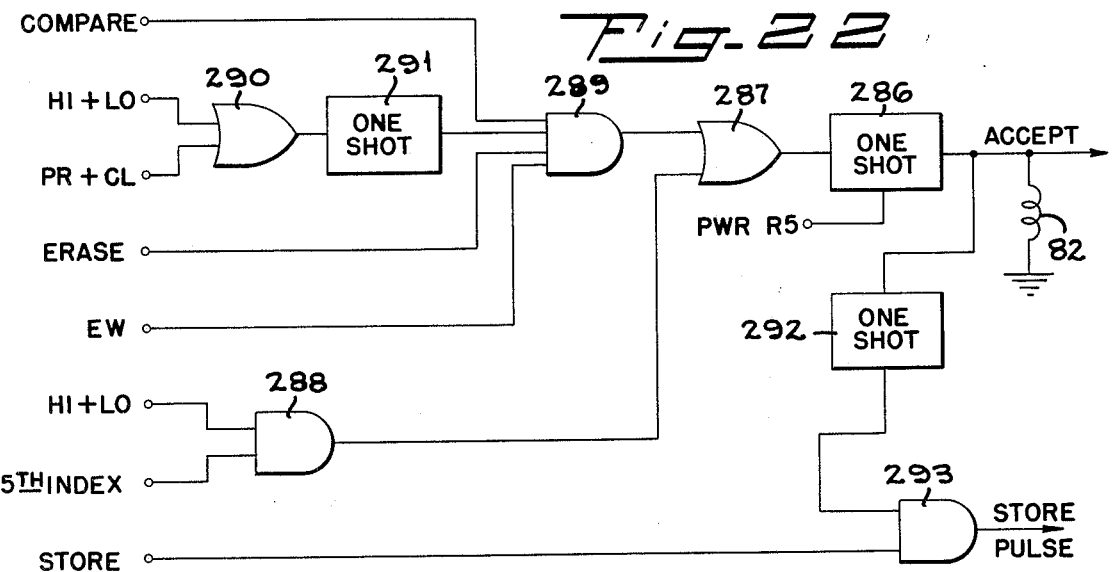
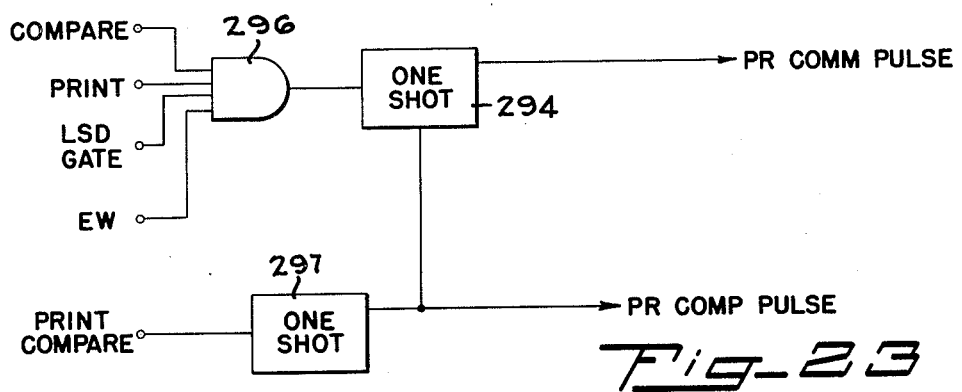

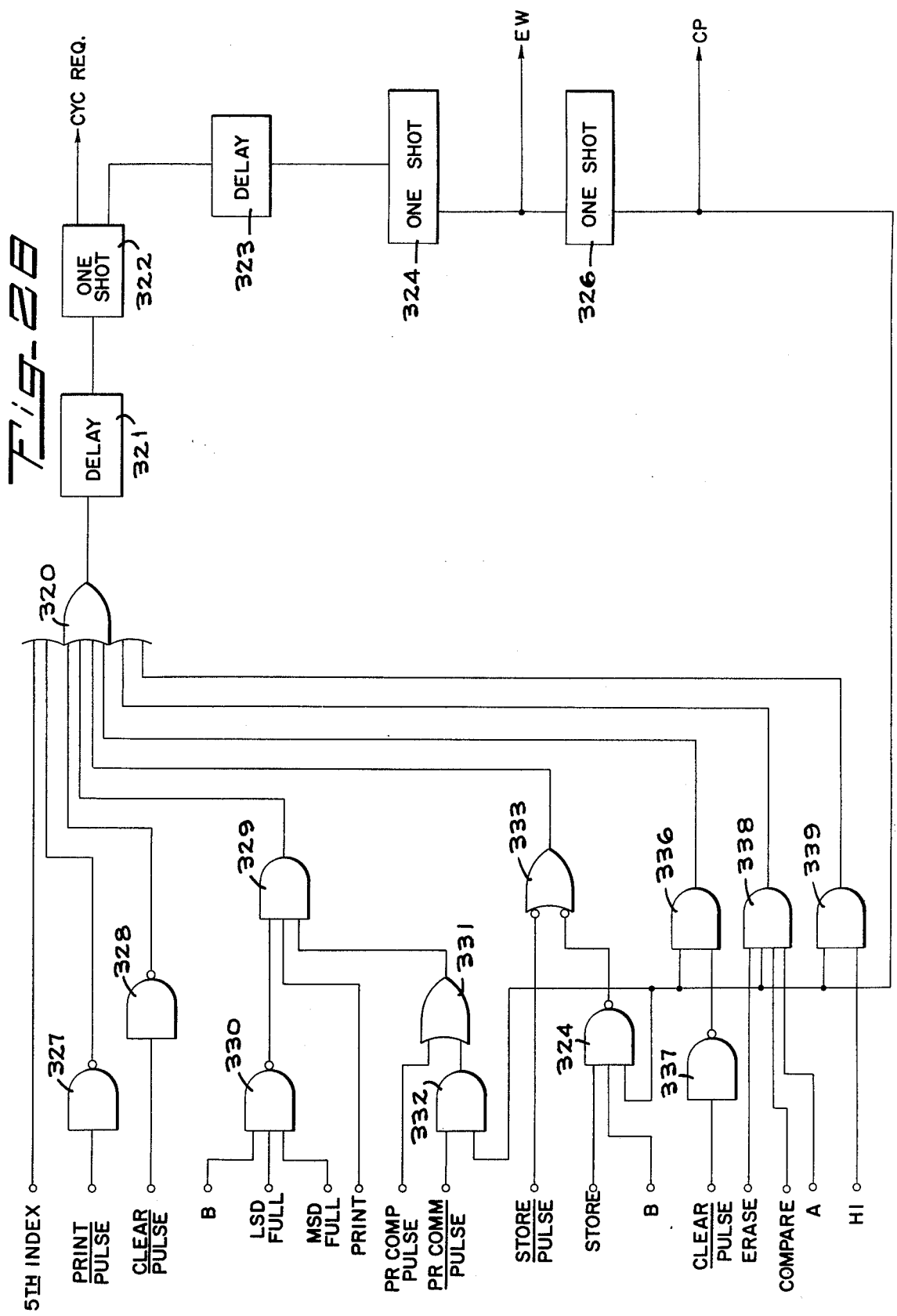

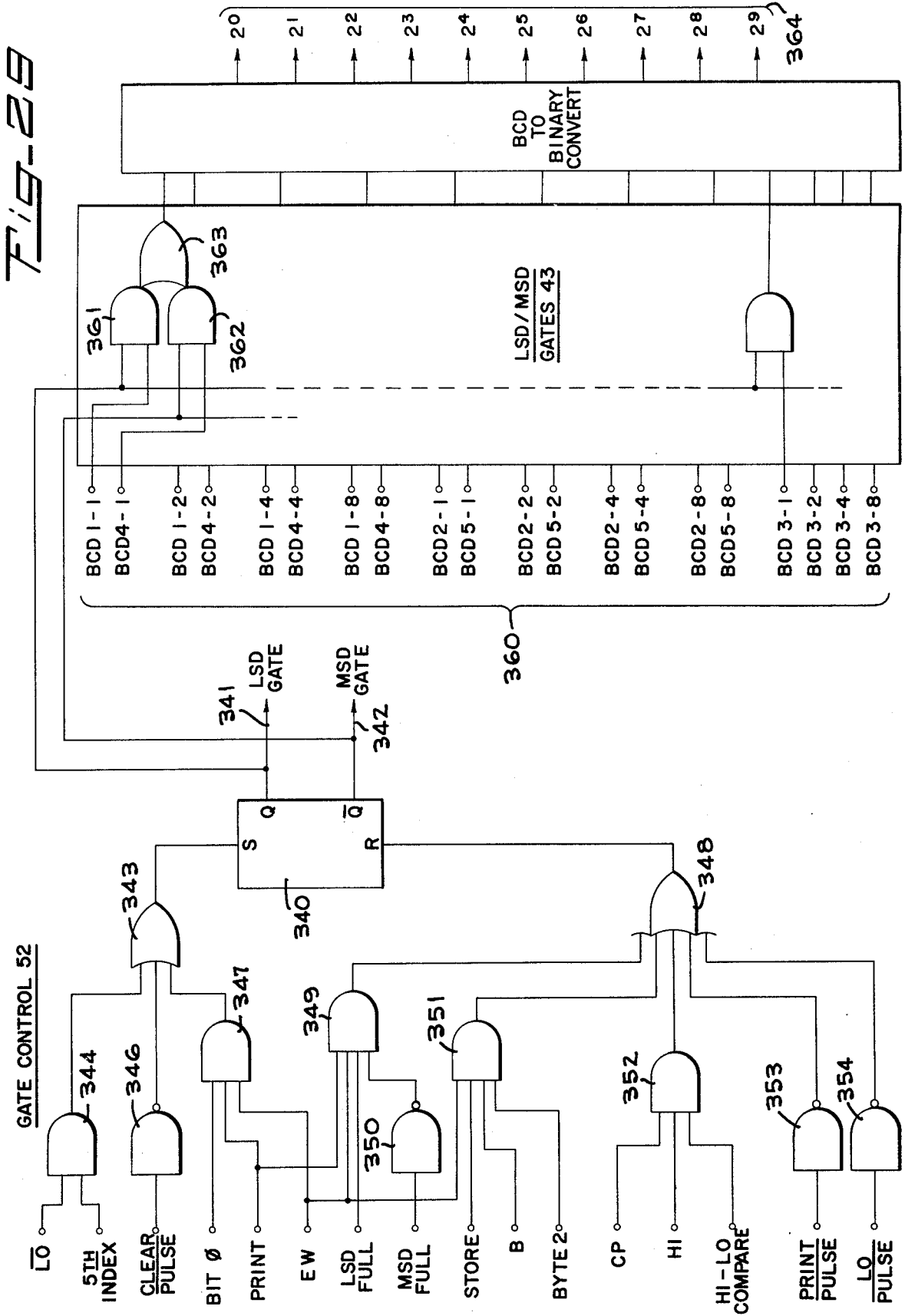

APPARATUS FOR AND METHOD OF AUDITING BUSINESS RECORDS

BACKGROUND OF THE INVENTION

This invention relates generally to a method of and apparatus for maintaining an audit of a plurality of items bearing sequential machine readable numbers, and more particularly to a method of and apparatus for reading characters representing numerics from a plurality of guest checks, maintaining an audit of such guest checks, and providing a read out upon demand of the unprocessed checks.

Many retail trade businesses, particularly bar and restaurants, are susceptible of sustaining large losses due to employee theft. It has been extimated that losses due to employee theft during the year 1972 in the United States is about four billion dollars. One of the reasons for such high losses is that the employee is exposed to large amounts of merchandise and money during the course of his employment and is, therefore, in a position to divert some of that merchandise or money out of the normal course of commerce and into his own possession. When either inadequate or no controls exist which prevent the management of an establishment from maintaining surveillance of such activities, the employee's opportunities to divert either merchandise or funds without detection is greatly enhanced. This is particularly true in bar and restaurant operations, where a guest check is issued for a meal and money is received by the waiter or waitress from the customer. Without any control on the number of guest checks issued, an employee entrusted with receiving money from the customer can easily destroy the guest check and appropriate the receipts.

One of the most prevalent controls in the bar and restaurant industry for preventing such theft is in the use of sales slips and guest checks which are serially or sequentially numbered. The return of each numbered guest check assures the management that the transaction has occured. In the bar and restaurant industry, such controls are the only method for confirming that a sale has occured, since the merchandise has been consumed and is not visibly removed from the establishment. By periodically auditing the sales slips or guest checks which are deposited at the cash register of such an establishment, it is possible to detect the missing sales slips or guest checks and thus have a basis for the investigation of the misappropriation of funds.

The above described controls, however, have not been successful in the past, due to a number of shortcomings, such as the lack of systematic auditing, human error, and costs. At the present time, sequence number auditing is entirely a manual operation for the bar and restaurant industry. The large increase in both customers and dollars has strained this traditional method of operation. Furthermore, such an operation is subject to numerous human variables, such as fatigue, mistakes, sickness, employee turnover, lack of ability, etc. Additionally, the high cost of labor to perform the auditing function tends to discourage management from maintaining such as audit.

Accordingly, it can be readily appreciated that a need exists for a method of and apparatus for maintaining an audit of guest checks issued to employees of a retail trade establishment. Furthermore, the need exists for such a method and apparatus which can be employed quickly and easily to reduce the labor costs involved in such an audit. Additionally, the need exists for such a method and apparatus which can permit the immediate observation of any unrecorded guest checks.

SUMMARY OF THE INVENTION

Accordingly, it is a primary object of the present invention to provide an apparatus for maintaining an audit of sequentially numbered documents, such as sales slips and guest checks which are assigned to a particular employee of an establishment.

Another object of the present invention is to provide such an apparatus which can be located in the immediate vicinity of a cash register and can be employed quickly and easily to reduce labor costs involved in maintaining such an audit.

A feature of the present invention resides in the provision of means for determining the validity of a particular guest check being processed, returning all valid guest checks after being processed to the cashier, or storing the guest checks in a separate storage compartment and retaining all invalid guest checks in a locked compartment for later investigation and disposition.

Another feature of the present invention resides in the provision of circuit means for transferring a number associated with a particular guest check from one memory to another memory whenever that particular guest check represents an auditing condition other than a cash payment.

These and other objects and features of the present invention are attained by an apparatus which is capable of auditing sequentially numbered documents, such as by storing a block of numbers associated with a block of guest checks assigned to a particular employee and for removing from storage a guest check number when it is presented for payment of the transaction recorded thereon. The apparatus includes a printer for displaying any unprocessed guest checks whenever such a display is required. When a particular guest check is presented for payment of the transaction recorded thereon, it is passed through a scanner and, if the number thereon is valid, the number is erased from the memory device.

The apparatus of the present invention has the distinct advantage of maintaining a complete audit of all sequentially numbered documents, such as guest checks employed by a particular establishment so that any unreturned guest checks can be immediately detected. If a misappropriation of funds is attendant to the missing guest check, the responsible person can be immediately questioned.

The invention, however, as well as other objects, features and advantages thereof will be more fully realized and understood from the following detailed description, when taken in conjunction with the accompanying drawings, wherein:

DESCRIPTION OF THE DRAWINGS

FIG. 4 is a plan view of a coded member employed in conjunction with the apparatus illustrated in the block diagram of FIG. 1 and having coded portions thereon in accordance with the teachings of the present invention;

FIG. 5 is a view in perspective of a mask associated with a scanner constructed in accordance with the principles of the present invention for reading the coded portions of the coded member illustrated in FIG. 4;

FIG. 6 is a partial diagrammatic and partial plan view, partly in section and partly broken away of a scanner constructed in accordance with the principles of the present invention and employing the mask illustrated in FIG. 5;

FIG. 7 is a graphical representation of a pattern area corresponding to the coded portions of the coded member illustrated in FIG. 4;

FIG. 8 is a plan view of another coded member similar to that illustrated in FIG. 4;

FIG. 9 is a plan view of another coded member having coded portions thereon in accordance with the principles of the present invention;

FIG. 10 is still another coded member having coded portions thereon in accordance with the teachings of the present invention;

FIG. 12 is a partial block and partial logic diagram of the LSD counter, the HI register, and the comparison circuit illustrated in the block diagram of FIG. 1;

FIG. 13 is a block diagram of the MSD counter illustrated in the block diagram of FIG. 1;

FIG. 14 is a partial block and partial schematic diagram of the mode select circuit illustrated in the block diagram of FIG. 1;

FIGS. 15, 16, 17, 18, and 19 are logic diagrams of circuits associated with the mode select circuit illustrated in FIG. 14;

FIG. 21 is a logic diagram of a comparison circuit associated with the apparatus illustrated in the block diagram of FIG. 1;

FIG. 22 is a partial block and partial logic diagram of certain control logic employed in conjunction with the apparatus illustrated in the block diagram of FIG. 1;

FIG. 23 is a partial block and partial logic diagram of a circuit for activating the printer illustrated in the block diagram of FIG. 1 and for providing certain control signals for some of the elements illustrated in FIG. 1;

FIG. 28 is a partial block and partial logic diagram of a timing circuit employed in conjunction with the apparatus illustrated in FIG. 1; and FIG. 29 is a partial block and a partial logic diagram of the LSD-MSD gates, the gate control circuit, and the BCD to binary converter illustrated in the block diagram of FIG. 1.

Like reference numerals throughout the various views of the drawings are intended to designate the same or similar elements.

DETAILED DESCRIPTION OF THE PREFERRED EMBODIMENT

Figure 1:
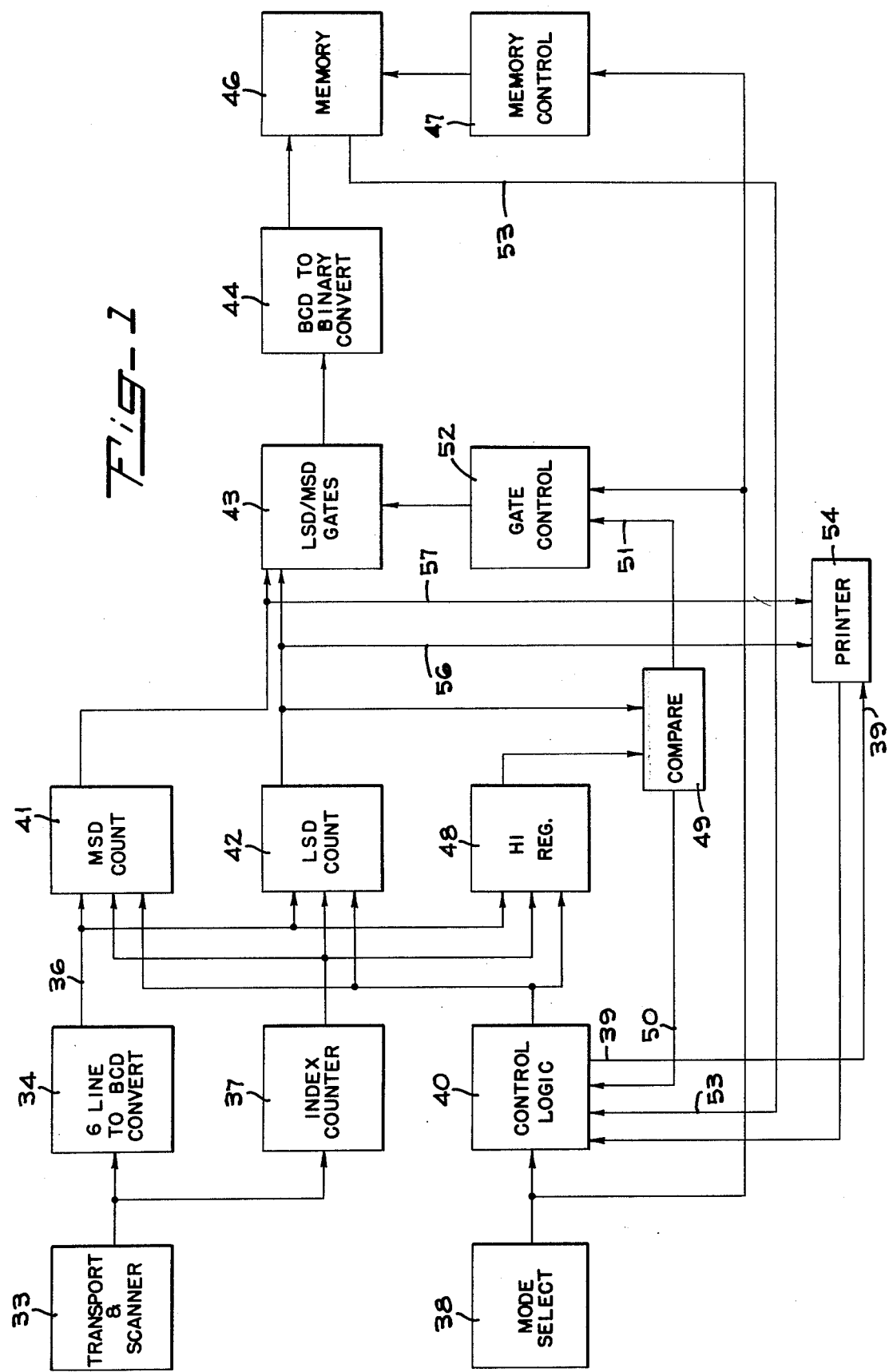
FIG. 1 is a block diagram of an apparatus for maintaining an audit of sales slip or guest check numbers which is constructed in accordance with the principles of the present invention.

With particular reference to FIG. 1, there is shown a block diagram of an apparatus for maintaining an audit of a plurality of sales slips or guest checks which is constructed in accordance with the principles of the present invention. As shown therein, a transport and scanner 33 is disposed for receiving a sales slip or guest check and reading certain numeric characters in coded from printed thereon. The output of the scanner 33, as will be more fully understood from the description of FIGS. 4–10, is seven lines of information, six lines of which correspond to a numeric character being read and the remaining line corresponding to an index mark being read which is associated with each character. The six lines of information from the scanner 33 are connected to the input of a six line-to-BCD converter 34 which supplies an output on a line 36 in BCD form corresponding to the six inputs supplied thereto. The seventh line of information from the scanner 33 is supplied to an index counter 37 and control logic circuit 40.

The mode of operation is selected by a mode select circuit 38 which supplies control signals to a control logic circuit 40. A counter 41 is disposed for being preset with the most significant digits (MSD) of the numeric characters being scanned by the scanner 33 and a counter 42 is disposed for being preset with the least significant digits (LSD) of the numeric characters being scanned by the scanner 33 from a particular sales slip or guest check. In the disclosed embodiment of the present invention, each guest check has five machine readable numeric characters thereon and information corresponding to the two most significant digits thereof is initially stored in the counter 41 and information corresponding to the three least significant digits thereof is initially stored in the counter 42. Such information corresponding to the two most significant digits and the three least significant digits is supplied to the counters 41 and 42 via the line 36. The counters 41 and 42 are enabled to receive such information by an output of the index counter 37 and outputs of the control logic 40, both of which are connected to the counters 41 and 42.

Outputs of the counters 41 and 42 are supplied through a plurality of gates 43 to a BCD-to-Binary converter 44. The information corresponding to the two most significant digits and the three least significant digits of the numeric character being scanned is supplied in binary form at an output of the converter 44 as addresses to a memory 46. Initially, when a block of guest checks has been assigned to a particular employee, the guest check in that block having the lowest numeric value is inserted into the transport and scanner 33 to provide, by means of the above described circuits, an address to the memory 46 corresponding to the scanned number. A memory control circuit 47, in response to certain inputs supplied thereto, enters bits of information into the memory 46 at the particular address supplied thereto. Accordingly, the lowest number from the block of assigned guest checks is entered into the memory 46 and the corresponding mode of operation is called the LO mode.

After the operator has inserted the lowest number of the block assigned guest checks into the apparatus, the guest check containing the highest numeric value is inserted into the transport and scanner 33. This is accomplished during the HI mode of operation. Information corresponding to the numeric characters contained on the highest numbered guest check of the assigned block is supplied by means of the line 36 to the input of a register 48. The register 48 is also enabled to receive this information by appropriate signals from the index counter 37 and the control logic circuit 40. During this mode of operation, however, the information corresponding to the highest guest check number is not entered into the counters 41 and 42.

After the highest number from the assigned block of guest checks is entered into the register 48, the control logic circuit 40 initiates a count of the counter 42 and, if necessary, a count of the counter 41. When an output of the counter 42 corresponds with an output of the register 48, as determined by a comparison circuit 49 which is connected to the outputs of each, a signal is supplied via a line 50 to the control logic 40 to terminate the counting cycle. Until such a comparison exists, however, the comparison circuit 49 supplies a signal via a line 51 to a gate control circuit 52 which provides appropriate enabling signals to the plurality of gates 43. As the counters 41 and 42 are counted from the lowest number to the highest number, appropriate addresses are supplied, via the BCD-to-binary converter 44, to the memory 46. Accordingly, when the highest number of the block of assigned guest checks is entered and scanned, addresses corresponding to all of the numbers in sequence, beginning from the lowest number to the highest number, are supplied to the memory 46 and appropriate bits are supplied to such address positions from the memory control circuit 47.

After all of the numbers corresponding to the block of assigned guest checks have been entered into the memory 46, the apparatus is enabled by means of the mode select circuits 38 to accept guest checks via the transport scanner 33 and to erase from the memory 46 information corresponding to such guest checks which are determined to be valid according to certain rules. In this mode of operation, called the ERASE mode, the apparatus is also capable of removing information from an address in one portion of the memory 46 and inserting that information at a corresponding address in another portion of the memory 46. This transfer mode, called the STORE mode is employed when the transaction recorded on a particular guest check which is being scanned is other than a cash sale and it is desired to maintain a record of such transactions. For example, this mode of operation may be employed for maintaining an audit of all transactions which have been charged by means of a credit card.

When it is desired to determine the numbers of the unprocessed guest checks from the assigned block of guest checks, the mode select circuit 38 supplies an appropriate signal to enable the control logic circuit 40 to reset the counters 41 and 42. Thereafter, the control logic circuit 40 is enabled to count, first the counter 42 and then the counter 41, until a particular address in the memory 46 is found to contain information on line 53 corresponding to a stored number. When such a condition exists, a signal is supplied on a line 39 to a printer 54. Such a signal enables the printer 54 and causes it to print a number corresponding to the particular outputs of the counters 41 and 42 at that point in time. Such outputs of the counters 41 and 42 are supplied to the printer 54 via lines 56 and 57. During this mode of operation, called the PRINT mode, the counters 41 and 42 are disabled from counting.

When the printer 54 has completed its printing cycle, an appropriate signal is supplied by a line 58 to the control logic circuit 40 which enables the appropriate one of the counters 41 and 42 to continue the counting cycle until the next address is found which contains information corresponding to an unprocessed guest check. During the CLEAR mode of operation, the apparatus is returned to its initial quiescent state.

The above description of the apparatus is only an approximation of the actual operation of the disclosed apparatus. Details of the apparatus and an exact description of its operation, however, will be more fully understood from the following detailed description.

Figure 2:
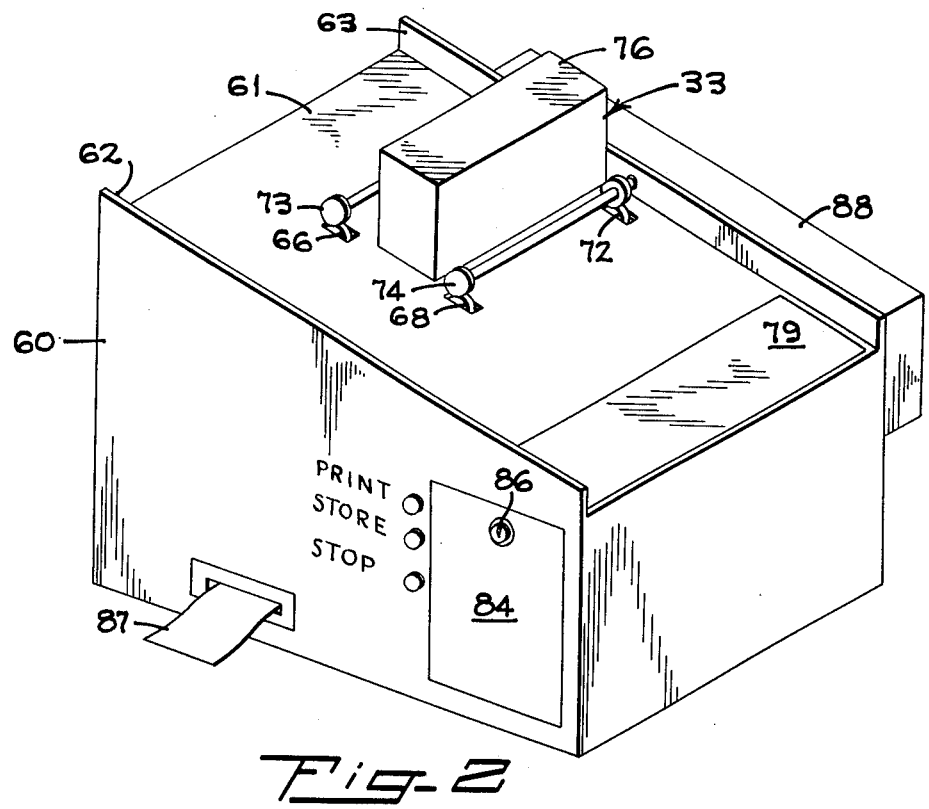
FIG. 2 is a view in perspective of the extra mechanical features of the apparatus not illustrated in the block diagram of FIG. 1.
Figure 3:
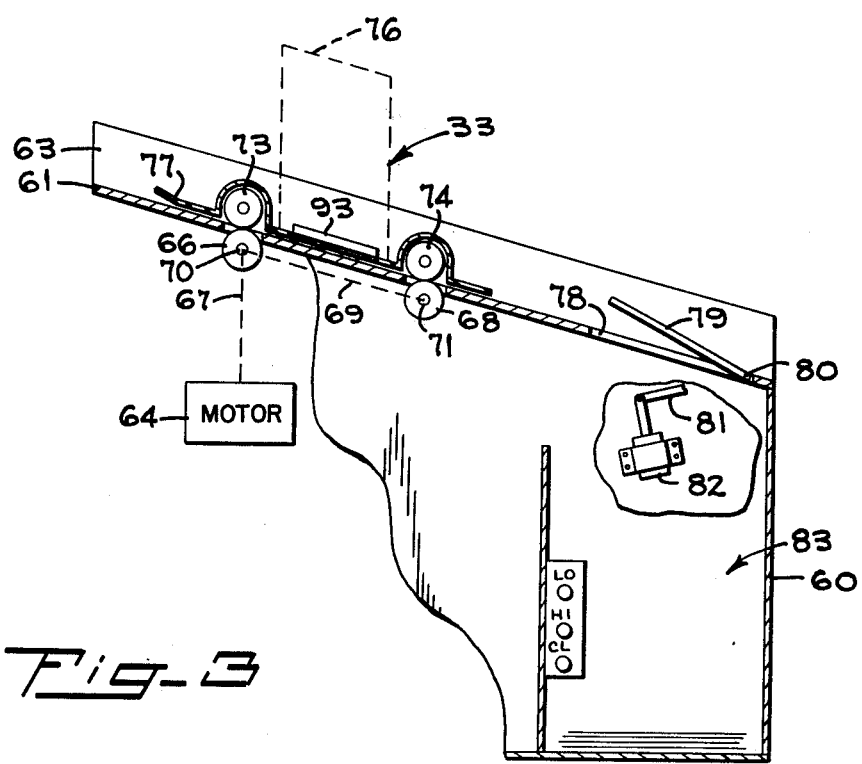
FIG. 3 is a sectional view partially broken away, of the transport, scanner, and accept mechanism of the apparatus illustrated in FIG. 2.

FIGS. 2 and 3 illustrate some of the mechanical features of the apparatus, particularly the transport, scanner, and accept mechanism. The apparatus is contained in a housing 60 having a top wall 61 which may be inclined with respect to the horizontal to effectively form a ramp for receiving a sales slip or guest check thereon. The upper surface 61 of the housing 60 is bounded on two sides thereof by guide rails 62 and 63 for guiding a sales slip or guest check through the transport and scanner assembly 33. If desired, an adjustable guide rail can be mounted on the surface 61 which will permit the acceptance of sales slips and guest checks of varying sizes.

A motor 64 (FIG. 3) is connected in driving relation to a drive roller 66, as represented by the dotted line designated with the reference numeral 67, and to a drive roller 68, as represented by the dotted line designated with the reference numeral 69. The drive roller 66 is connected by means of a shaft 70 to another drive roller (not shown) and the drive roller 68 is connected by means of a shaft 71 to a drive roller 72. Each of the drive rollers extends through appropriate apertures in the plate 61, with an upper surface of the plate 61 being tangential to a circumference of each. A plurality of idler rollers, including rollers 73 and 74, are mounted for frictional engagement, each with a corresponding one of the drive rollers. When the motor 64 is energized and the edge of a guest check is inserted between the first set of rollers, including the drive roller 66 and the idler roller 73, the check will be carried under the scanner assembly, which is indicated with the reference numeral 76 and is shown in full lines in FIG. 2 and in dotted lines in FIG. 3. As the leading edge of the guest check passes under the scanner 76, it is engaged by the forward rollers including the drive roller 68 and the idler roller 74 and carried along the upper surface of the top wall 61 away from the scanner 76. Although not shown in FIG. 2, the transport is provided with a cover plate 77 as shown in FIG. 3 which has an aperture therein for permitting the scanner 76 to read the printed matter on the guest check passing therethrough.

The lower end of the top wall 61 is provided with an aperture 78 in which a door 79 is mounted for pivotal movement on a shaft 80 and is disposed for rotating the shaft 80 in response to actuation of a solenoid 82 which is mounted on a side wall of the housing 60. In its normally quiescent state, the solenoid 82 maintains the door 79 in an open position as illustrated in FIG. 3. However, when the solenoid 82 is actuated, the door 79 is closed, as illustrated in FIG. 2. The aperture 78, which can be closed by the door 79, opens into a chamber or compartment 83 within the housing 60. Access to the compartment 83 can be gained by means of a door 84 having a lock 86 thereon. If a particular guest check is to be accepted, the door 79 is closed by means of the solenoid 82, such that the guest check continues down the inclined upper surface of the top wall 61, over the door 79, and into a bin (not shown) at the forwaard end of the housing 60. However, if a particular guest check is not accepted for a particular reason, as will be explained in greater detail hereinbelow, the door 79 remains open and the guest check being processed passes through the aperture 78 and is trapped in the compartment 83. If the operator cannot gain access to the compartment 83, because of the locked door 84, the guest checks deposited therein are held till the manager or owner of an establishment is available to open the door 84 to determine the reason for the unacceptability of the trapped guest check.

Six mode select buttons are provided, including PRINT, STORE, STOP, LO, HI, and CLEAR, each of which corresponds to a similarly designated mode of operation. The first three of those mode select buttons are located on the outside of the housing 60, while the latter three are located behind the door 84, so that only personnel having a key to the lock 86 can gain access thereto. The function of each of these mode select buttons will be explained in greater detail in the following description.

An output of the printer 54 (see FIG. 1) is provided on a paper tape 87. (See FIG. 2). Mounted on the side of the housing 60 is a housing 88 for the solenoid 82, the motor 64 and drive train associated with the motor 64 and represented by the dotted lines 67 and 69.

FIG. 4 is a plan view, partially broken away, of a coded guest check 90 which has printed thereon a plurality of pattern areas, one of which is designated with the reference numeral 91. Each pattern area corresponds to a particular numeric character and includes, as a minimum, at least one pattern portion corresponding to an index mark, one of which is designated with the reference numeral 92 in FIG. 4. The printed pattern areas illustrated in FIG. 4 are both human readable and machine readable numeric characters. The number represented by the numeric characters illustrated in FIG. 4 is, obviously, 50172. As will be explained in greater detail hereinbelow, each pattern area includes a pattern portion corresponding to one half of a horizontal line of a numeric character which is printed in block form. The scanner 76 of the present invention is capable of reading such pattern portions as well as the pattern portion 92 corresponding to an index mark.

FIG. 5 is a perspective view of a mask 93 employed by the scanner 76 to sense the pattern portions of numeeric characters coded in accordance with the principles of the present invention. As shown in FIG. 5, the mask is provided with a plurality of apertures 94, each of which is positioned to sense one half of a horizontal line of a numeric character which is printed in block form. More particularly, the apertures 94 are arranged in three rows and two columns. In addition, the mask 93 is provided with an aperture 96 which is aligned to correspond with the index mark 92 in each pattern area.

FIG. 6 is a diagrammatic representation of the scanner 76 employing the mask 93 for sensing the pattern portions of the pattern areas on a coded guest check 90. The scanner 87 employs a plurality of fiber optic bundles 97, each of which is associated with one of the apertures 94 or with the aperture 96 in the mask 93.

Fiber optic bundles are available in which approximately one half of the fibers in a particular bundle are separated from the other half at one end of the bundle, but are equally intermingled with one another at the other end of the bundle. The use of such fiber optic bundles permits the transmission of light from a light source through the fiber optic bundle to an object and the transmission of light reflected from the object through the fiber optic bundle to a sensor.

As shown in FIG. 6, a light source 98 is employed for illuminating one half of the fibers in each of the bundles 97. The other half of the fibers in each of the bundles 97 extend to a plurality of sensors 99. The other end of each of the bundles 97 at which the fibers are intermingled with one another is mounted over an appropriate one of the apertures 94 or the aperture 96 to permit the transmission of light in both directions therethrough. The approximate position of that end of a particular fiber 97 around the apertures 94 and 96 is represented by the dotted lines in FIG. 5 represented with the reference numeral 100. Accordingly, light from the light source 98 is transmitted through one half of the fibers in each of the bundles 97, through a corresponding one of the apertures 94 or 96 to the surface of the coded member 90. Light which is reflected from the coded member 90 is transmitted back through the apertures 94 or 96 and through the other one half of the fibers of each of the bundles 97 to a corresponding one of the sensors 99. One sensor is provided for each fiber optic bundle 97 in the plurality of sensors 99.

The ink used in printing should be of a light absorbing type and the paper on which the numbers are printed should have good light reflective characteristics. Such ink is known as OCR ink and such paper is well-known in this art.

FIG. 7 is a graphical representation of the location of pattern portions on a grid associated with each pattern area corresponding to a numeric character. In one embodiment of the present invention, the grid associated with each pattern area was provided with a width dimension, represented by the reference numeral 101, of 0.190 inch, and a length dimension, represented by the reference numeral 102, of 0.200 inch. The dimensions which are represented with the reference numerals 103 and 104 were made equal to one half of the width and length dimensions, respectively, or 0.095 inch and 0.100 inch, respectively. The length of the pattern portion corresponding to an index mark, represented by the reference numeral 106, was 0.125 inch. Each of the horizontal lines forming pattern portions were centered on the grid shown in FIG. 7 and had a width from 0.045 inch to 0.050 inch. The vertical lines of the pattern portions were also centered on the vertical lines of the grid shown in FIG. 7 and had a width from 0.015 inch to 0.020 inch. The width of the index mark 92 corresponded to the width of the vertical lines of the pattern portions. Adjacent pattern portions on a coded member were spaced apart, such that the distance between adjacent vertical lines of adjacent grids was 0.060 inch. The pattern area positioned closest to a corner 107 of the coded member was spaced, such that the upper right hand corner of its grid was located approximately 0.250 inch from an adjacent edge of the coded member 90 and approximately 0.250 inch from the top edge of the coded member 90.

FIG. 4 shows one half of the numeric characters employed in the decimal system and FIG. 8 illustrates the remaining one half of such characters. Because of the particular geometry employed for the mask 93 of the scanner 76, it can be readily appreciated that the vertical lines in each of the pattern areas, with the exception of the index mark can be omitted and that the scanner 76 will be able to read each character. However, the absence of the vertical lines does not facilitate human readability of the characters. FIG. 9 illustrates one form of a pattern area with the vertical lines omitted and FIG. 10 represents still another form of a pattern area with the vertical lines omitted. The pattern areas illustrated in FIGS. 9 and 10 correspond to the numeric character "5." It will be noted that in each of the forms of the pattern areas represented in FIGS. 4, 8, 9 and 10, that the index mark 92 is aligned with the center vertical line of a grid associated therewith. The aperture 96 of the mask 93 (see FIG. 5) is positioned to correspond with the position of the index mark 92. Accordingly, if the position of the index mark 92 is altered from that which is illustrated in the drawings, the illustrated position of the aperture 96 with respect to the apertures 94 must also be changed. As will be explained in greater detail hereinbelow, the circuitry associated with the scanner 76, and more particularly with the sensors 99 requires the sensing of an index mark 92 within the field of the aperture 96 and its associated fiber optic bundle 97 before any numeric information corresponding to any other sensed pattern portions will be employed.

Figure 11:
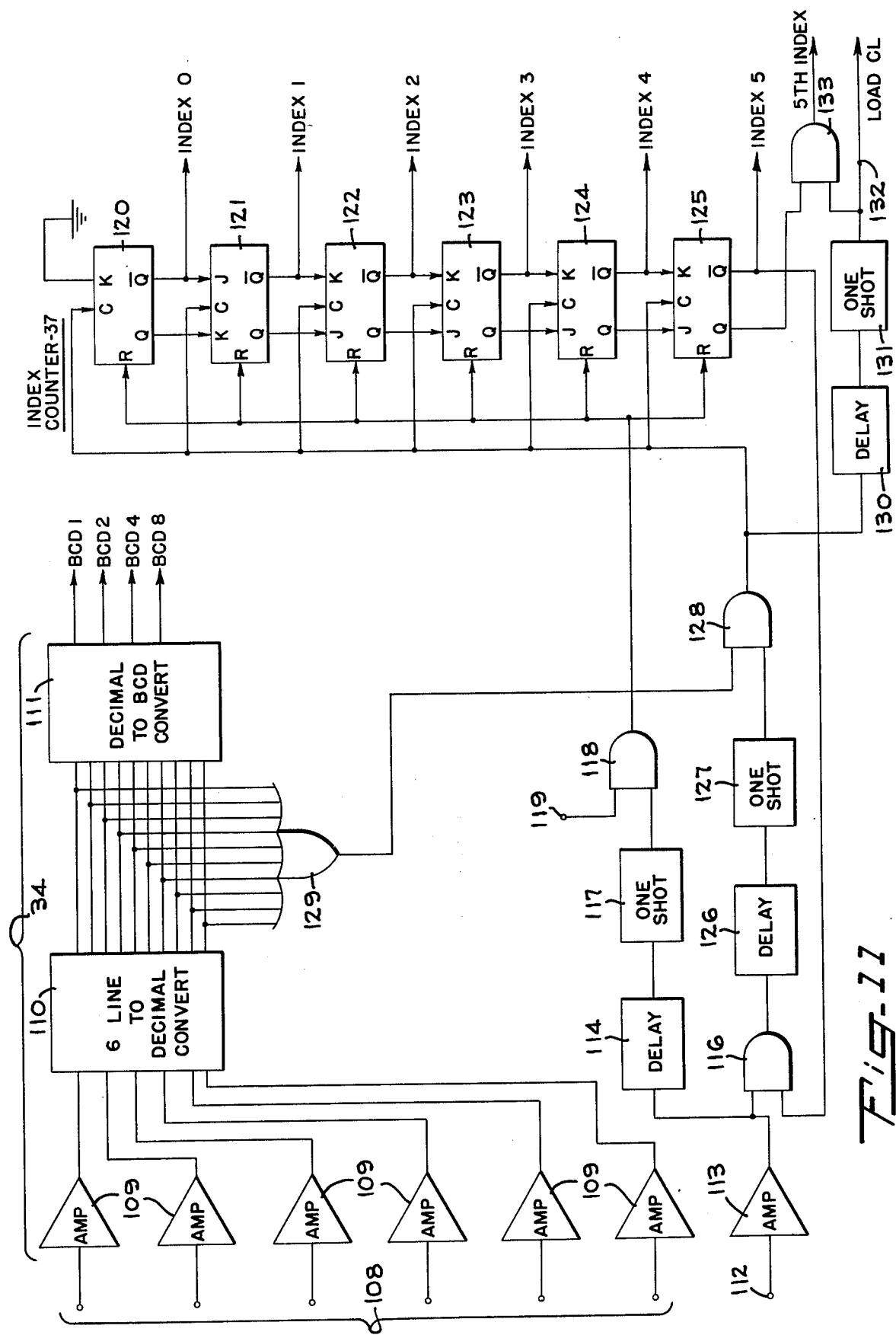
FIG. 11 is a partial block and partial logic diagram of the circuitry associated with the scanner illustrated in the block diagram of FIG. 1 and in FIG. 6.

FIG. 11 is a partial block and partial logic diagram of the circuitry associated with the scanner 76. Each of the sensors 99 which is associated with one of the apertures 94 is connected to a respective one of a plurality of input terminals 108. Each of the terminals 108 is connected through a respective amplifier 109 to a respective input of a circuit 110 which converts from six line input information to decimal information at its output. Such a six line-to-decimal converter employs standard logic circuitry to perform the conversion function, which circuitry is well known to those skilled in the art. The ten outputs of the converter circuit 110 are supplied to appropriate inputs of a decimal-to-BCD converter 111 which converts the decimal information at its inputs to BCD information at its outputs. The outputs of the converter circuit 111 are designated BCD 1, 2, 4 and 8, respectively. Such a decimal-to-BCD converter is also well known in the art. The converter 110 and 111 form the converter circuit 34 illustrated in FIG. 1.

The sensor 99 which is associated with the aperture 96 and which is disposed for sensing the index marks 92 is connected to a terminal 112 which is, in turn, connected through an amplifier 113 to a delay circuit 114 and to one input of an AND gate 116. An output of the delay circuit 114 is connected through a one shot multivibrator circuit 117 to one input of an AND gate 118. The other input of the AND gate 118 is connected by means of a terminal 119 to a power reset signal which is generated whenever line power is terminated by means (not shown) which are well known in the art. Such a signal will be employed with other circuit elements to be described hereinbelow. An output of the AND gate 118 is connected to the reset input of each of a purality of flip-flops 120-125 which are connected to form the index counter 37.

The $\overline{Q}$ output of the flip-flop 125 is connected to the second input of the AND gate 116 which has its output connected through a delay circuit 126 and a one shot multivibrator circuit 127 in series with one another to one input of an AND gate 128. Each of the outputs of the converter circuit 110 are connected to respective inputs of an OR gate 129 having its output connected to the second input of the AND gate 128. Accordingly, when one of the outputs of the converter circuit 110 is high, an output will be provided from the OR gate 129 to enable the AND gate 128. An output of the AND gate 128 is connected to each of the clock inputs of the flip-flop 120-125.

Flip-flops 120-125 of the counter 37 provide output signals from each of the $\overline{Q}$ outputs which are designated INDEX 0-5, respectively. The flip-flops 120-125 are connected, as shown in the drawing, such that the first clock pulse generated at an output of the AND gate 128 causes the $\overline{Q}$ output of the flip-flops 120 and 121 to go from a high level to a low level. Subsequent outputs from the AND gate 128 do not alter the state of the flip-flop 120, but upon the occurence of a second clock pulse, the $\overline{Q}$ output of the flip-flop 120 goes from a low level to a high level and the $\overline{Q}$ output of the flip-flop 122 goes from a high level to a low level. Thereafter, subsequent clock pulses cause succeeding ones of the flip-flops 123-125 to alter their state in succession. Accordingly, when the first index mark 92 is sensed, and following the delay caused by the delay circuit 126, the INDEX 0 and INDEX 1 signals will be generated. The second index mark which is sensed will not remove the INDEX 0 signal, but will remove the INDEX 1 signal and generate the INDEX 2 signal. The counter 37 continues to count with each successive index mark which is sensed. Upon the occurence of the 5th index mark, the $\overline{Q}$ output of the flip-flop 125 will be at a low level, thereby disabling the AND gate 116 and any subsequent index marks which may be sensed will not alter the state of the counter 37.

The delay caused by the delay circuit 114 is sufficient to permit the index counter 37 to count through one complete cycle before each of the flip-flops 120-125 is reset by a signal produced at the output of the AND gate 118. In a constructed embodiment of the present invention, the delay of the delay circuit 114 was set at 0.55 second and the delay of the delay circuit 126 was set at 0.6 millisecond. The pulses produced by the one shot multivibrator circuits 117 and 127 were 150 nanoseconds in duration.

The output of the AND gate 128 is also connected through a delay circuit 130 and a one shot multivibrator circuit 131 to an output line 132 and to one input of an AND gate 133. The other input of the AND gate 133 is connected to the Q output of the flip-flop 125. Accordingly, when the 5th index mark is sensed and the INDEX 5 signal is generated, a signal designated 5th INDEX will be generated following the delay caused by the delay circuit 130. In a constructed embodiment of the present invention, the delay of the circuit 130 was set at 150 nanoseconds and the pulse generated by the one shot multivibrator circuit 131 was 150 nanoseconds in duration. The signal generated on the line 132 is designated LOAD CLOCK. Each of the INDEX 0-5 signals, the 5th INDEX signal and the LOAD CLOCK signal are employed in the circuitry to be described hereinbelow.

The LSD counter 42, HI register 48 and comparison circuit 49 illustrated in FIG. 1 are shown in greater detail in FIG. 12. The LSD counter 42 is formed of three counter stages 134, 135 and 136, each of which is disposed for receiving information in BCD form corresponding to one of the three least significant digits of the guest check number being scanned. The BCD information generated at an output of the converter circuit 111 (FIG. 11) is supplied in parallel to terminals 140–143 of the counter stage 134. The inputs 140–145 provide preset information for the counter stage 134. Input terminals 144 of the counter stage 135 and input terminals 146 of the counter stage 136 are connected in parallel with the terminals 140–143. Accordingly, the same preset information is supplied to each of the counter stages 134–136 simultaneously.

Each of the counter stages 134–136 are identical and, therefore, the input conditions required for presetting information therein and for initiating a count therein will be described in conjunction with the counter stage 134 only. Before the information supplied to the terminals 140–143 is preset into the counter stage 134, the signal supplied to a terminal 147 must be low and the signals supplied to terminals 148 and 149 must also be low. As indicated in the drawing, the signal supplied to the terminal 147 is the INDEX 1 signal. The signals supplied to the terminals 148 and 149 are designated C LSD and C ENBL, respectively, and will be described in greater detail hereinbelow in connection with FIG. 20. The counter stage 134 is reset by the application of a PRINT PULSE signal to a terminal 150, which signal will be described hereinbelow in connection with FIG. 14. The counter stage 134 is caused to count when the input conditions thereto are such that the INDEX 1 signal is high and the C ENBL signal is high and a negative pulse is supplied to the terminal 148.

An input terminal 151 of the counter stage 135 is connected to the INDEX 2 signal and an input terminal 152 of the counter state 136 is connected to the INDEX 3 signal. The input terminals 153 of the counter stage 135 are connected in parallel with the terminals 148–150 and the input terminals 154 of the counter stage 136 are connected in parallel with the terminals 148–150. Accordingly, it can be appreciated that when the INDEX 1 signal is generated and the above described input conditions are correct, the BCD information at an output of the converter circuit 111 will be entered into the counter stage 134. The INDEX 1 signal is generated when the index mark 92 associated with a first coded area corresponding to a numeric character is scanned. Accordingly, the BCD information corresponding to such a numeric character, upon scanning of the same, will be entered into the counter stage 134. In a like manner, the BCD information corresponding to the second scanned numeric character will be entered into the counter stage 135 and the BCD information corresponding to the second scanned numeric character will be entered into the counter stage 135 and the BCD information corresponding to the third scanned numeric character will be entered into the counter stage 136.

As previously described in connection with the block diagram illustrated in FIG. 1, the guest check having the lowest number printed thereon of a block of assigned guest checks is initially scanned and the information corresponding to the three least significant digits are entered into the counter 42. As will be more fully understood from the following description, when such a guest check is initially entered to be scanned, appropriate control signals are generated which will provide the correct inputs to the terminals 147, 148 and 149 to permit the entry of the necessary information into the counter stage 134. In addition, the counter stages 135 and 136 will also be conditioned by appropriate control signals to permit the entry of the correct information therein. During the entry of information corresponding to the lowest number of a guest check, the two most significant digits of that low number will be entered into the MSD counter 41 as will be described in conjunction with FIG. 13.

After the guest check having the lowest number is scanned, the guest check of the assigned block of guest checks having the highest number is scanned and the information corresponding to the three least significant digits of that number is entered into the HI register 48. The HI register 48 is formed of three register stages 156, 157 and 158, each of which is disposed for receiving the information corresponding to one digit of the least significant digits of the highest number being scanned. Terminals 159, 160 and 161 of the stages 156–158, respectively, are connected in parallel with the terminals 140–143 to receive the BCD information from the output of the converter circuit 111. An input terminal 162 of the register stage 156 is connected to the INDEX 1 signal; an input terminal 163 of the register stage 157 is connected to the INDEX 2 signal; and an input terminal 164 of the register stage 158 is connected to the INDEX 3 signal. Input terminals 166, 167 and 168 of the register stages 156, 157 and 158, respectively, are connected to a signal designated HI-$CLOCK$. When this signal is high and the INDEX 1, 2 or 3 signal is high, information supplied to the terminals 159, 160 and 161 will be entered into a corresponding one of the register stages 156, 157 and 158.

As previously indicated, the counter stages 134, 135 and 136 can be counted, starting with either a zero count or the count which is preset therein, by adding a count of "1" thereto for each negative pulse of the C LSD signal. Of course, the other input conditions which have been described above must also be correct to permit such a counting function to occur. After the three least significant digits of the highest guest check number have been entered into the HI register 48, the appropriate inputs for the LSD counter 42 are conditioned to permit a counting cycle to begin. Accordingly, the LSD counter 42 is counted until its output corresponds to the output of the HI register 48. As will be described in greater detail hereinbelow, with each count of the LSD counter 42, a new address is generated and supplied to the memory 46 if the gates 43 (FIG. 1) are properly conditioned.

The comparator circuit 49 includes three comparator stages 170, 171 and 172. The comparator stage 170 compares the output of the counter stage 134 with the information contained in the register stage 156 and when a comparison exists supplies a signal to one input of a NAND gate 173. The comparator stages 171 and 172 perform a similar compare function with the information contained in the register stage 157 and with the information supplied at an output of the counter stage 135 and the information contained in the register stage 157 and with the information supplied at an output of the counter stage 136 and the information contained in the register 158 and supply appropriate inputs to the NAND gate 173. Accordingly, when the LSD counter 42 has been counted by the application of C LSD pulses thereto until its output corresponds to the information contained in the HI register 48, a signal designated HI-LO COMPARE will be generated (low level) at an output of the NAND gate 173.

When the guest check containing the lowest number is being scanned, the two most significant digits thereof are entered into the MSD counter 41 which is shown in greater detail in FIG. 13. The MSD counter 41 is formed of two counter stages 176 and 177. Input terminals 178 of the counter stage 176 are connected in parallel with the terminals 140–143 and receive the BCD information from an output of the converter circuit 111. Input terminals 179 of the counter stage 177 are also connected in parallel with the terminals 140–143 to receive the same BCD information. Input terminal 180 of the counter stage 176 is connected to the INDEX 4 signal and input terminal 181 of the counter stage 177 is connected to the INDEX 5 signal. A signal designated C MSD is connected to an input terminal 182 of the counter stage 176 and an input terminal 183 of the counter stage 177. The C ENBL signal is connected to an input terminal 186 of the counter stage 176 and to an input terminal 187 of the counter stage 177. The PRINT $\overline{\text{PULSE}}$ signal is supplied to an input terminal 188 of the counter stage 176 and to an input terminal 189 of the counter stage 177 which are, in turn, connected to the respective reset inputs of such counter stages.

The MSD counter 41 operates the same as the LSD counter 42. Considering the counter stage 176, the INDEX 4 signal must be at a low level and the C MSD signal and the C ENBL signal must both be low to permit information supplied to the terminals 178 to be preset therein. Similarly, the counter stage 176 can be counted when the INDEX 4 signal is high and the C ENBL signal is high and a negative pulse is supplied to the input terminal 182. The counter stage 177 is responsive to the same input conditions on its corresponding input terminals to perform the same functions.

In order to more fully understand the complete operation of the disclosed apparatus, the generation of some of the input signals discussed above should be considered. Accordingly, reference is made to FIG. 14 in which a portion of the mode select circuitry 38 is illustrated. As shown therein, the mode select circuit 38 includes five switches; namely, a LO switch 200, a HI switch 201, a PRINT switch 202, a CLEAR switch 203 and a STORE switch 204, which are actuatable by the corresponding identified button described in connection with FIGS. 2 and 3. Each of the switches 200–204 are connected to the set input of a respective one of a plurality of latches 206–210. Actuation of the switch 200 to set the latch 206 initiates and establishes the LO mode of operation for permitting a guest check having the lowest number of an assigned block of guest checks to be scanned and the numerical information thereon stored in memory 46.

One output of the latch 206 is connected through a one shot multivibrator circuit 211 to develope at an output thereof a signal designated LO $\overline{\text{PULSE}}$. A LO signal is provided on an output line 212 and a $\overline{\text{LO}}$ signal is provided on an output line 213.

Actuation of the switch 201 to set the latch 207 initiates and establishes the HI mode of operation. A HI signal is provided on an output line 214 of the latch 207 which is connected to a reset input of the latch 206. A $\overline{\text{HI}}$ signal is provided on an output line 216 of the latch 207.

The PRINT mode of operation is established by actuation of the switch 202 to set the latch 208. A PRINT signal is provided on an output line 217 which is connected to the input of a one shot multivibrator circuit 218 to provide at an output thereof a PRINT $\overline{\text{PULSE}}$ signal. A $\overline{\text{PRINT}}$ signal is provided on an output line 219 of the latch 208. The PRINT $\overline{\text{PULSE}}$ signal is employed, as discussed above, for resetting the LSD counter 42 and the MSD counter 41.

The CLEAR mode of operation is initiated and established by actuation of the switch 203 to set the latch 209. A CLEAR signal is provided on output line 220 which is connected to an input of a one shot multivibrator circuit 221 to provide at its output a CLEAR $\overline{\text{PULSE}}$ signal. A $\overline{\text{CLEAR}}$ signal is provided on an output line 222 of the latch 209. The STORE mode of operation is established by actuation of the switch 204 to set the latch 210 to provide a STORE signal on an output line 223 and a $\overline{\text{STORE}}$ signal on an output line 224. When one of the latches 206–210 is set, the corresponding output signal which is generated which is not shown with a bar is high and the corresponding output signal which is generated which is shown with a bar is low. The bar over the pulse signals generated by the one shot multivibrator circuits 211, 218 and 221 indicate that a negative pulse is produced when the corresponding latch 206, 208 and 209, respectively, is initially set. This same convention will be employed throughout this description.

The STORE mode of operation is employed in conjunction with the ERASE mode of operation which is generated by logic circuitry illustrated in FIG. 15. As shown therein, the HI signal is applied to one input of an OR gate 226 and the LO signal is applied to the other input thereof. An output of the OR gate 226 generates a signal designated HI+LO which is connected to one input of a NOR gate 228. The PRINT signal is supplied to one input of an OR gate 229 and the CLEAR signal is supplied to the other input thereof. A signal is produced at the output of the OR gate 229 which is designated PR+CL and is connected to the other input of the NOR gate 228. The ERASE signal is generated at an output of the NOR gate 228 and is supplied to an inverter circuit 227 to generate the $\overline{\text{ERASE}}$ signal.

When the ERASE signal is high, the ERASE mode of operation is established. The ERASE signal, as can be appreciated from the above, is generated whenever the apparatus is not in either one of the HI, LOW, PRINT or CLEAR modes of operation.

With reference to FIG. 14, each of the latches 206–210 must be reset under certain conditions. The signal supplied to the terminal 119 in FIG. 11 and discussed in detail hereinabove is supplied via a terminal 230 to a reset input of each of the latches 206–210. As previously mentioned, the HI signal is supplied to the other reset input of the latch 206, such that when the latch 207 is set the latch 206 will be reset. A HI RESET signal is supplied from the circuit illustrated in FIG. 14 via a terminal 231 to a reset input of the latch 207. A PRINT RESET signal generated by the circuit illustrated in FIG. 17 is applied via a terminal 232 to a reset input of the latch 208. A CLEAR RESET signal generated by the circuit illustrated in FIG. 16 is applied via a terminal 233 to a reset input of the latch 209. A STORE RESET signal is generated by the circuit illustrated in FIG. 17 and applied via a terminal 234 to a reset input of the latch 210.

Before FIGS. 16–19 can be discussed in detail, the significance of certain signals supplied as inputs thereto should be understood. The memory 46 requires a predetermined amount of time between the receipt of information at one address and the receipt of information at another address therein. Accordingly, when information is being supplied to the memory 46, it must be properly timed and sequenced to permit the memory 46 to receive it. Such a timing function is performed by the circuit illustrated in FIG. 28, in which a signal designated EW and a signal designated CP are generated at the end of a writing cycle performed by the memory 46, which as signals refer to "end write" and "continue pulse," respectively.

For reasons which will be explained in greater detail hereinbelow, the memory 46 is divided into two parts designated A and B, respectively, each containing 1024 address positions containing 4 bits of data per address position. As will be appreciated from the following, section A of the memory 46 is disposed for storing all of the numbers associated with a block of assigned guest checks and section B is disposed for storing all of the numbers of the guest checks which are processed, but do not involve a cash sale. Accordingly, section B is employed during the STORE mode to receive information transferred from section A during the ERASE mode. Each of the sections A and B of the memory 46 are divided into four subsections, each containing 1024 address positions.

The first subsection of each section (A or B) is disposed for storing information at an address corresponding to the most significant digits (MSD) of a guest check, the second subsection of each section is disposed for storing information at an address corresponding to the least significant digits (LSD) of a guest check, and the other two subsections of each section are disposed for storing information at an address corresponding to the least significant digits of a guest check to identify the information in the second subsection with information in the first subsection. Although each subsection contains 1024 address positions, in the disclosed embodiment, only 100 address positions are used in the first subsection of each section and only 1000 address positions are used in each of the second, third and fourth subsections of each section.

Figure 24:
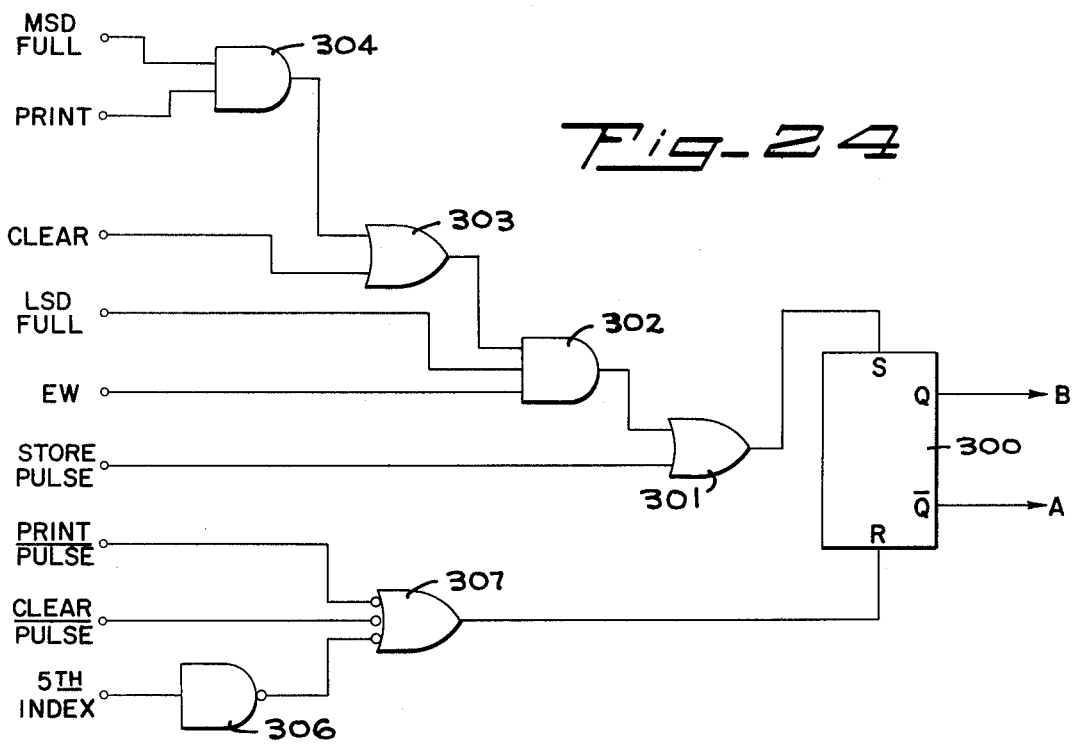
FIGS. 24, 25, 26 and 27 are logic diagrams of portions of the memory control circuit illustrated in the block diagram of FIG. 1.

The circuit illustrated in FIG. 24 generates signals designated A and B, respectively which are operative to address the corresponding sections in the memory 46. The circuits illustrated in FIGS. 26 and 27 generate signals designated BYTE 1 and BYTE 2. The BYTE 1 signal is effective to enable writing information into the first subsection of 1024 addresses in each of the sections A and B. Accordingly, when the BYTE 1 signal is high and the A signal is high, the first subsection of section A of the memory 46 will be enabled to receive information at whatever address is supplied thereto. In a like manner, when the BYTE 2 signal is high and the A signal is high, the remaining three subsections of 3072 address positions in section A of the memory 46 will be enabled to receive information. Section B of the memory 46 is enabled in a similar manner.

In FIGS. 12 and 13, the counter stages 134, 135, and 136 of the LSD counter 42 and the counter states 176 and 177 of the MSD counter 41 are resettable internally upon receipt of the next counting inputs supplied to each after attaining a count of "9" therein. Such a count is attained in the counter stage 134, for example, when the BCD 1-1 and BCD 1-8 outputs thereof high. When each of the counter stages 134, 135 and 136 have been counted to a maximum, a signal designated LSD FULL is generated on an output line 235. In FIG. 13, when the counter stages 176 and 177 have been counted to a maximum, a signal designated MSD FULL is supplied on an output line 236.

The circuit illustrated in FIG. 22 generates a signal designated ACCEPT which is disposed for energizing the solenoid 82 discussed in connection with FIG. 3. The above described signals are employed in the circuitry described immediately hereinbelow.

With reference to FIG. 19, the $\overline{\text{HI-LO COMPARE}}$ signal generated at an output of the NAND gate 173 is inverted by an invertor 237 to generate a HI-LO COMPARE signal on an output line 238 which is supplied to one input of an AND gate 239. The EW signal is supplied to a second input of the AND gate 239 and the BYTE 1 signal is supplied to a third input of the AND gate 239. When the HI-LO COMPARE signal, the EW signal, and BYTE 1 signal are high, the HI RESET signal will be generated to reset the latch 207.

Accordingly, the latch 207 is reset to remove the apparatus from the HI mode of operation when the information in the LSD counter 42 corresponds to the information preset into the HI register 48, and the first subsection of either the A or B section of the memory 46 is enabled, and a memory cycle has been completed.

The CLEAR RESET signal is generated at an output of an AND gate 240 in FIG. 16 having one of its inputs connected to the CP signal and its other input connected to the $\overline{\text{CLEAR PULSE}}$ signal. Accordingly, when the $\overline{\text{CLEAR PULSE}}$ signal goes high and a memory cycle has been completed, the latch 209 will be reset. With reference to FIG. 14, in a constructed embodiment, the one shot multivibrator circuit 221 provided a pulse output in the form of the CLEAR $\overline{\text{PULSE}}$ signal having a duration of 50 milliseconds. Accordingly, the CLEAR mode of operation has a duration of 50 milliseconds.

The STORE RESET signal is generated at an output of an OR gate 241 in FIG. 17. One input to the OR gate 241 is supplied by means of a switch 242 which is actuatable by the STOP button described in connection with FIG. 2. Accordingly, actuation of the switch 242 will generate the STORE RESET signal to reset the latch 210. The other input to the OR gate 241 is supplied from an output of an AND gate 243. The BYTE 1 signal is supplied to one input of the AND gate 243, the EW signal is supplied a second input thereof, the STORE signal is supplied to a third input thereof, the B signal is supplied to a fourth input thereof, and a signal designated BIT $\phi$ is supplied to a fifth input thereof. The signal designated BIT $\phi$ is supplied from the memory 46 and is the information contained at a particular address in the first subsection of either section A or section B thereof. Accordingly, when the BIT stored in the first subsection of section B of the memory 46 corresponding to the most significant digit is a 1 and a memory cycle has completed, the latch 210 will be reset.

The PRINT RESET signal is generated at an output of an OR gate 244. One input to the OR gate 244 is supplied from an output of an AND gate 246 and the other input thereof is supplied from an output of an AND gate 247. The switch 242 is connected to one input of the AND gate 246 and the EW signal is connected to the other input thereof. Accordingly, when the switch 242 is actuated and a memory cycle has been completed, the PRINT RESET signal will be high to reset the latch 208. The EW signal is also connected to one input of the AND gate 247, the PRINT signal is connected to a second input thereof, the LSD FULL signal is connected to a third input thereof, the MSD FULL signal is connected to a fourth input thereof, and the B signal is connected to a fifth input thereof. Accordingly, during the PRINT mode of operation, when all of the addresses of the memory 46 have been indexed as indicated by the high level of the LSD FULL signal, the MSD FULL signal and the B signal, and a memory cycle has been completed, the latch 208 will be reset.

With reference to FIG. 18, when certain conditions exist, an output will be provided from an OR gate 250 to energize a lamp 251 to indicate to the operator of the apparatus that it is in a "busy" state and that a new operation cannot be initiated. The INDEX 0 signal is connected through an invertor 249 to a first input of the OR gate 250, the $\overline{ERASE}$ signal is connected to the second input thereof, the STORE signal is connected to a third input thereof, and the ACCEPT signal is connected to a fourth input thereof. The INDEX 0 signal will be low during scanning of the guest check and inputting the information therefrom into the appropriate circuit. Accordingly, during this time the lamp 251 will be illuminated to indicate a busy condition. The lamp 251 will also be illuminated during the $\overline{ERASE}$ mode of operation and during the STORE mode of operation. When a guest check is being accepted, the ACCEPT signal will be high to also illuminate the lamp 251. An output of the OR gate 250 is connected through an inverter 252 to energize a lamp 253 whenever the lamp 251 is not energized to indicate that the apparatus is available to initiate an operation.

In the preceding description of FIGS. 12 and 13, certain signals were discussed as inputs to the counter stages and register stages illustrated therein. Such signals are generated by the circuit illustrated in FIG. 20. However, before discussing the circuit illustrated in FIG. 20, the significance of certain signals supplied as inputs thereto should be understood.

As described in connection with the block diagram illustrated in FIG. 1, the gate control circuit 52 supplies enabling signals to the gates 43. This circuit is illustrated in FIG. 29 and generates two signals designated LSD GATE signal and MSD GATE signal.

In the above description of the various subsections and sections forming the memory 46, it was stated that the last two subsections of each section are disposed for storing information at an address corresponding to the least significant digits of a guest check to identify the information in the second subsection with information in the first subsection. With the quantity of address positions in the memory 46 discussed hereinabove, the apparatus of the present invention is capable of storing no more than 1,000 guest check numbers. Accordingly, the two most significant digits of the lowest guest check number will be either equal to or one less than the two most significant digits of the highest guest check number in a particular block of assigned guest checks.

This function is accomplished by writing a 1 information bit in the third subsection of either section A or B if the first most significant digit of a stored guest check number is odd and writing a 0 therein if the first most significant digit is even. A 1 or 0 is stored in the fourth subsection if the second most significant digit is odd or even, respectively. The circuit illustrated in FIG. 21 generates a COMPARE signal when the address applied to the first subsection corresponding to the most significant digit of the guest check number compares with the information in the third and fourth subsections and a 1 exists in the second subsection at the LSD address corresponding thereto.

The circuit illustrated in FIG. 23 generates a print command signal which is supplied to the printer 54 and is designated PR COMM PULSE signal. When the printer 54 has completed its printing function, it supplys an appropriate signal to generate by means of the circuit illustrated in FIG. 23 a pulse signal which is designated PR COMP PULSE signal.

Figure 20:
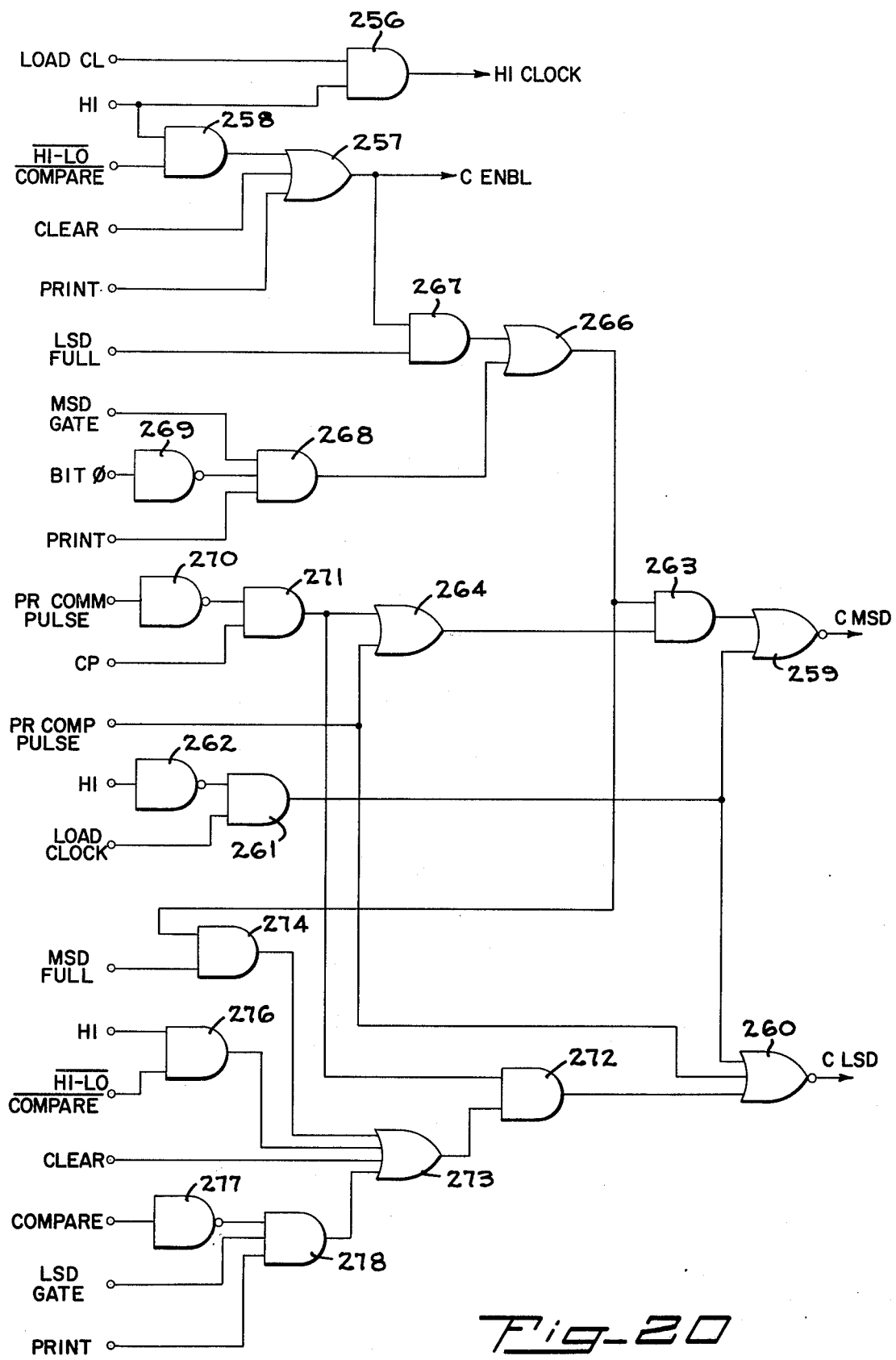
FIG. 20 is a logic diagram of the control logic illustrated in the block diagram of FIG. 1.

The above described signals are employed as inputs to the circuit illustrated in FIG. 20 to which reference is made. The HI.CLOCK signal employed as an input to the HI register 48 is generated at an output of an AND gate 256. The LOAD CLOCK signal is supplied to one input of the AND gate 256 and the HI signal is supplied to the other input thereof. Accordingly, when the apparatus is in the HI mode of operation and the LOAD CLOCK signal is generated in response to the sensing of an index mark, the HI.CLOCK signal will be generated. Therefore, during the HI mode of operation when a guest check is being scanned, the information corresponding to the three least significant digits thereof will be entered into the HI register 48.

The C ENBL signal which is employed as one input to the MSD counter 41 and as one input to the LSD counter 42 is generated at an output of an OR gate 257. The HI signal is connected to one input of an AND gate 258 and the $\overline{HI-LO\ COMPARE}$ signal is connected to the other input thereof. An output of the AND gate 258 is connected to one input of the OR gate 257, the CLEAR signal is connected to a second input thereof, and the PRINT signal is connected to a third input thereof. As previously mentioned, when the C ENBL signal is low, the counters 41 and 42 are partially enabled to permit information to be preset therein. Also as mentioned, when the C ENBL signal is high, the counters 41 and 42 are partially enabled to permit them to be counted. The C ENBL signal is high when the apparatus is in the HI mode and comparison does not exist between the output of the LSD counter 42 and the output of the HI register 48. The C ENBL signal is also high during the CLEAR mode of operation or the PRINT mode of operation. Under all other conditions, the C ENBL signal will be low.

The C MSD signal is generated at an output of a NOR gate 259 and the C LSD signal is generated at an output of a NOR gate 260. One input to each of the NOR gates 259 and 260 is supplied from an output of an AND gate 261. The HI signal is inverted by an inventor 262 and supplied to one input of the AND gate 261 and the LOAD CLOCK signal is supplied to the other input thereof. Accordingly, the C MSD and the C LSD signals will be low, as required to preset information in the counters 41 and 42 whenever the apparatus is not in the HI mode and a LOAD CLOCK pulse is generated.

The second input to the NOR gate 259 is supplied from an AND gate 263 having one of its inputs connected to the output of an OR gate 264 and its other input connected to an output of an OR gate 266. One input to the OR gate 266 is supplied from the output of an AND gate 267 having one of its inputs connected to the C ENBL signal and its other input connected to the LSD FULL signal. The second input to the OR gate 266 is supplied from the output of an AND gate 268. The MSD GATE signal is supplied to a first input of the AND gate 268, the PRINT signal is supplied to a second input thereof, and the BIT $\phi$ signal is supplied through an inverter 269 to a third input thereof.

The PR COMM PULSE signal is connected through an inverter 270 to one input of an AND gate 271 and the CP signal is supplied to the other input of the AND gate 271. The output of the AND gate 271 is connected to one input of the OR gate 264 and the PR COMP PULSE signal is connected to the other input thereof. Accordingly, when the apparatus is in the HI mode, the output of the counter 42 does not compare with the output of the register 48, and the LSD counter 42 has been counted to a maximum (LSD FULL), a count of 1 will be added to the MSD counter 41 when the PR COMM PULSE signal is low and a memory cycle has been completed. Such a count of 1 is added to the MSD counter 41 while the LSD counter 42 is being counted and passes through a zero condition. If, for example, the count in the MSD counter 41 is 39 and the LSD counter 42 has counted to a maximum of 999, both the MSD counter 41 and the LSD counter 42 will be conditioned, if a comparison does not exist in the comparator 49, to add a count of 1 to each, such that the MSD counter 41 will contain a count of 40 and the LSD counter 42 will contain a count of 000. Since the PR COMM PULSE signal will be low at the same time that the CP signal is high when the apparatus is not in the PRINT mode.

The C MSD signal will also be low whenever the MSD GATE signal is high, the apparatus is in the PRINT mode, and a 0 information bit exists at the particular address in the first subsection of the memory 46 corresponding to the count in the MSD counter 41. Such conditions for the C MSD signal are employed for adding one or more 1's to the count in the MSD counter 41 until a particular address is achieved at which a 1 information bit is found in the first subsection of either the A or B section of the memory 46.

As previously discussed, the C LSD signal is low whenever the apparatus is not in the HI mode and the LOAD CLOCK signal is high. This condition is satisfied by the logic discussed above and connected to the first input of the OR gate 260. The PR COMP PULSE signal is applied to the second input of the OR gate 260, such that the C LSD signal is low whenever the printer 54 has completed one printing operation. A third input to the OR gate 260 is supplied from an output of an AND gate 272 having one of its inputs connected to the output of the AND gate 271 and its other input connected to the output of an OR gate 273. The output of the OR gate 266 is connected to one input of an AND gate 274 having its other input connected to the MSD FULL signal. The output of the AND gate 274 is connected to a first input of the OR gate 273. The HI signal and the HI-LO COMPARE signal are connected to the respective inputs of an AND gate 276 having its output connected to a second input of the OR gate 273. The CLEAR signal is connected to a third input of the OR gate 273. The COMPARE signal is connected through an inverter 277 to a first input of an AND gate 278, the LSD GATE signal is connected to a second input thereof, and the PRINT signal is connected to a third input thereof. The output of the AND gate 278 is connected to a fourth input of the OR gate 273. Accordingly, the C LSD signal will be low when a PR COMM PULSE signal is low and a memory cycle has completed and one of the following conditions exists:

1. the C ENBL signal is high and both of the counters 41 and 42 are at a maximum count;
2. the memory 46 is addressed at the last address in the first subsection and the information bit contained at that address is a 0 and the apparatus is in the PRINT mode;
3. the apparatus is in the Hi mode and the information contained in the counter 42 does not compare with the information contained in the high register 48;
4. the apparatus is in the CLEAR MODE; or
5. the COMPARE signal is low while the second subsection of the memory 46 is being addressed and the apparatus is in the PRINT mode.

The COMPARE signal is generated at an output of an AND gate 280 in FIG. 21. One input to the AND gate 280 is a signal designated BIT 1 which is the information contained in the second subsection of each section of the memory 46 which is being addressed. The information bit in the third subsection of each section of the memory 46, designated BIT 2, is connected through an inverter 281 to one input of an EXCLUSIVE OR gate 282. The BCD 4-1 signal is supplied to the second input of the EXCLUSIVE OR gate 282. The output of the EXCLUSIVE OR gate 282, which is high whenever the information bit stored in the third subsection of each section of the memory 46 corresponds to the information contained in the BCD 4-1 signal, is connected to a second input of the AND gate 280. The BIT 3 signal, which is the information contained in the fourth subsection of each section of the memory 46 is connected through an inverter 283 to one input of an EXCLUSIVE OR gate 284 and the BCD 5-1 signal is connected to the second input thereof. A similar comparison is provided by the EXCLUSIVE OR gate 284 as is provided by the EXCLUSIVE OR gate 282 and a corresponding signal is supplied therefrom to a third input of the AND gate 280. Accordingly, when a 1 information bit is contained in the second subsection corresponding to the LSD address and a comparison exists between the information bits contained in the third and fourth subsection thereof with the first most significant digit and the second most significant digit, respectively, the COMPARE signal will be high.

The previously discussed ACCEPT signal, which is disposed for energizing the solenoid 82 when it is high, is generated at an output of a one shot multivibrator circuit 286 (FIG. 22). The previously discussed power reset signal is connected to a reset input of the one shot multivibrater circuit 286. The output of an OR gate 287 is connected to an input of the one shot multivibrator circuit 286. One of its inputs of the OR gate 287 is connected to the output of an AND gate 288 and its other input connected to the output of an AND gate 289. The HI+LO signal is connected to one input of the AND gate 288 and the 5th INDEX signal is connected to the second input thereof. Accordingly, when the apparatus is either in the HI or the Lo modes of operation and the 5th INDEX signal is high as a result of a scanning operation, the ACCEPT signal will be high. These conditions occur when the guest checks containing the lowest number and the highest number of a block of assigned guest checks are being scanned for entry of the information corresponding thereto into the apparatus as discussed above.

The ACCEPT signal will also be high when the output of the AND gate 289 is high. The HI+LO signal is connected to one input of an OR gate 290 and the PR+CL signal is connected to the other input thereof. The output of the one shot multivibrator circuit 291, unlike the outputs of the other one shot multivibrator circuits discussed herein, is a negative pulse when the output of the OR gate 290 is high. Accordingly, when all of the other inputs to the AND gate 289 are high at a time when the apparatus is terminating either the HI mode, the LO mode, the PRINT mode or the CLEAR mode, and for the time duration determined by the one shot multivibrator circuit 291, the output of the AND gate 289 will be low. The COMPARE signal is connected to a second input of the AND gate 289, the ERASE signal is connected to a third input thereof, and the EW signal is connected to a fourth input thereof. Accordingly, when the apparatus is in ERASE mode, the COMPARE signal is high as determined by the circuit illustrated in FIG. 21, and a memory cycle has been completed, the output of the AND gate 289 will be high to generate the ACCEPT signal if the above condition does not exist at an output of the one shot multivibrator circuit 291.

The output of the one shot multivibrator circuit 286 is connected to the input of a one shot multivibrator circuit 292 having its output connected to one input of an AND gate 293. The other input of the AND gate 293 is connected to the STORE signal. The STORE PULSE signal is generated at an output of the AND gate 293 when the apparatus is in the STORE mode and the ACCEPT signal goes high.

The PR COMM PULSE signal is generated at an output of a one shot multivibrator circuit 294 in FIG. 23. The one shot multivibrator circuit 294 produces a pulse output when the output of an AND gate 296 is high. The COMPARE signal is connected to one input of the AND gate 296, the PRINT signal is connected to another input thereof, the LSD GATE signal is connected to a third input thereof, and the EW signal is connected to a fourth input thereof. Accordingly, when the apparatus is in the PRINT mode, the memory 46 is supplied with an address to the second subsection thereof (LSD), a comparison exists between the information contained at that address as determined by the circuit illustrated in FIG. 21, and a memory cycle has completed, the PR COMM PULSE signal will be generated to actuate the printer 54 to print the information contained in the MSD counter 41 and in the LSD counter 42. When the printer 54 has printed such information, it generates a signal designated PRINT COMPLETE which is supplied to the input of a one shot multivibrator circuit 297 to generate at its output the PR COMP PULSE signal which is connected to the reset input of the one shot multivibrator circuit 294. In a constructed embodiment of the present invention, the time duration of the pulse supplied at an output of the one shot multivibrator circuit 294 was set at 5 microseconds and the time duration of the pulse generated at an output of the one shot multivibrator circuit 297 was set at 150 nanoseconds. Accordingly, when the PRINT COMPLETE signal is generated by the printer 54, the one shot multivibrator circuit 294 is reset to permit another printing cycle to be initiated.

The A and B signals discussed hereinabove and employed to select either section A or section B of the memory 46 are generated at an output of a flip-flop circuit 300 illustrated in FIG. 24. When the signal supplied to the reset input of the flip-flop 300 goes high, the flip-flop will be reset and the A signal will be high and the B signal will be low. When, however, the signal supplied to the set input of the flip-flop 300 goes high, the flip-flop will be set and the A signal will be low and the B signal will be high. Under all other conditions, the outputs of the flip-flop 300 will remain in their previous states. The set input to the flip-flop 300 is supplied from an output of an OR gate 301 having one of its inputs connected to the STORE PULSE signal and its other input connected to the output of an AND 302. The EW signal is connected to one input of the AND gate 302, the LSD FULL signal is connected to a second input thereof, and the output of an OR gate 303 is connected to a third input thereof. The MSD FULL signal is connected to the first input of an AND gate 304 and the PRINT signal is connected to a second input thereof. An output of the AND gate 304 is connected to a first input of the OR gate 303 and the CLEAR signal is connected to a second input thereof. Accordingly, the output of the OR gate 301 will be high whenever the STORE PULSE signal is generated. The output of the OR gate 301 will also be high when the apparatus is in the CLEAR mode, the LSD counter 42 is at a maximum count, and a memory cycle has been completed. The output of the OR gate 301 will also be high when the apparatus is in the PRINT mode, the counters 41 and 42 are at a maximum count, and a memory cycle has been completed.

The PRINT PULSE signal is connected to one input of a negative OR gate 307, the CLEAR PULSE signal is connected to a second input thereof, and the 5th INDEX signal is connected through an inverter 306 to a third input thereof. Accordingly, when the apparatus is initially entering either the PRINT mode or the CLEAR mode, the flip-flop 300 will be reset. The flip-flop 300 will also be reset when a guest check is being scanned and the 5th index mark thereon is sensed.

Figure 25:
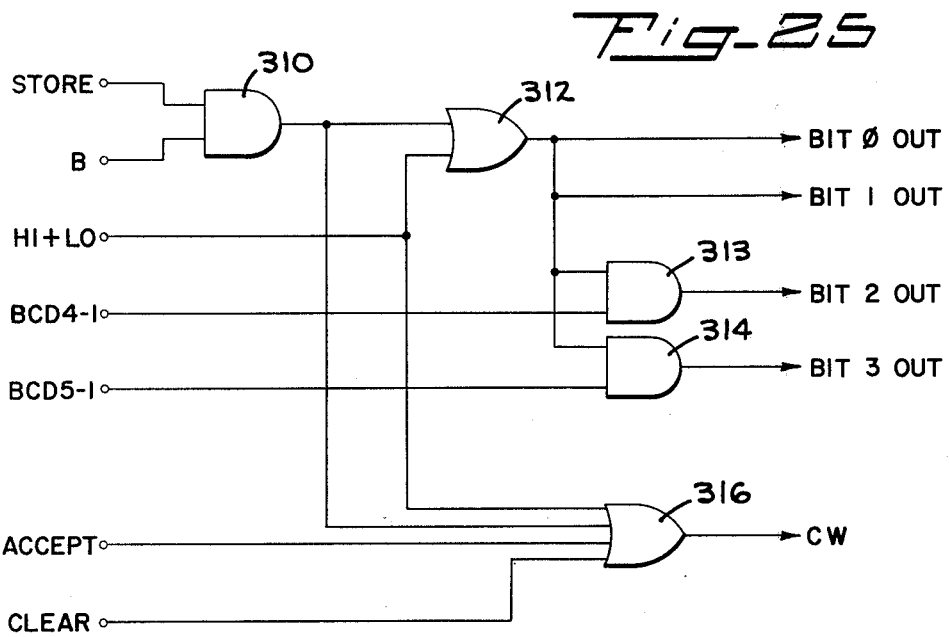

The information bits which are supplied to the memory at the addresses determined by the counters 41 and 42 and the state of the LSD/MSD gates 43 are generated by the circuit illustrated in FIG. 25. As shown therein, the STORE signal is connected to one input of an AND gate 310 and the B signal is connected to another input thereof. The output of the AND gate 310 is connected to one input of an OR gate 312 having its other input connected to the HI+LO signal. The output of the OR gate 312 generates the BIT $\phi$ OUT and the BIT 1 OUT to be supplied to the memory 46. Accordingly, whenever the apparatus is in the STORE mode and the B section of the memory 46 is enabled, a 1 information bit will be supplied to the appropriate address of the first subsection and to the address of the second subsection of section B of the memory 46, if the CW and the CYC REQ signals are high as will be discussed hereinbelow. When the apparatus is in either the HI or the LO mode of operation, the BIT $\phi$ OUT and the BIT 1 OUT will also be a 1. Accordingly, if the BYTE 1 signal (FIG. 26) is high and the output of the OR gate 312 is high, a 1 will be entered into the first subsection of either the A or B sections of the memory 46 and if the BYTE 2 signal (FIG. 27) is high and the output of the OR gate 312 is high, a 1 will be entered into the second subsection of either the A or B sections of the memory 46.

The output of the OR gate 312 is connected to one input of an AND gate 313 having its other input connected to the BCD 4-1 signal to generate the BIT 2 OUT information at its output. Accordingly, when the BYTE 2 signal is high and information is being entered into the second subsection of either sections A or B of the memory 46, the information corresponding to the level of the BCD 4-1 signal will be entered into the third subsection of the memory 46. The output of the OR gate 312 is also connected to one input of an AND gate 314 having its other input connected to the BCD 5-1 signal to generate at its output the BIT 3 OUT information.

The CW signal is generated at an output of an OR gate 316 having its first input connected to the output of the AND gate 310, its second input connected to the HI+LO signal, its third input connected to the ACCEPT signal, and its fourth input connected to the CLEAR signal. The CW signal is supplied to the memory 46 and indicates "clear write" to enable the memory 46 to receive information supplied thereto and in accordance with the addresses provided thereto. Accordingly, the CW signal will be high to enable the memory 46 whenever the apparatus is in the STORE mode and the B section of the memory 46 is enabled or the apparatus is in either the HI, LO or CLEAR mode, or the ACCEPT signal is high.

The first subsection of either sections A or B of the memory 46 is enabled for writing information thereinto by the BYTE 1 signal being high. This signal is generated at an output of an OR gate 317 in FIG. 26 having its first input connected to the MSD GATE signal, second input connected to the LO signal, and its third input connected to the CLEAR signal. Accordingly, whenever the apparatus is either in the LO mode or the CLEAR mode or the MSD gates are enabled, the BYTE 1 signal will be high. Writing information into the second subsection of either sections A or B of the memory 46 is enabled by the BYTE 2 signal being high. The BYTE 2 signal is generated at an output of the OR gate 318 in FIG. 27 which has its first input connected to the LSD gate signal and its second input connected to the CLEAR signal. Accordingly, when the apparatus is in the CLEAR mode or the LSD gates are enabled, the BYTE 2 signal will be generated. It will be noted that all four subsections of each of the A or B sections of the memory 46 are enabled whenever the apparatus is in the CLEAR mode.

The circuit illustrated in FIG. 28 generates appropriate control signals corresponding to the timing of a memory cycle. With reference to FIG. 28, the output of an OR gate 320 is connected through a delay circuit 321 to the input of a one shot multivibrator circuit 322. One output of the one shot multivibrator circuit 322 genertes the CYC REQ signal which is supplied to the memory 46 to indicate that a memory cycle is required. The output of the one shot multivibrator circuit 322 is connected through a delay circuit 323 to the input of a one shot multivibrator circuit 324. The output of the one shot multivibrator circuit 324 is the EW signal which is connected to the input of a one shot multivibrator circuit 326. The output of the one shot multivibrator circuit 326 is the CP signal.

In a constructed embodiment of the present invention, the time delay of the delay circuit 321 was set at 800 nanoseconds, the duration of the pulse output from the one shot multivibrator circuit 322 was set at 150 nanoseconds, the delay of the delay circuit 323 was set at 1500 nanoseconds, the duration of the pulse output from the one shot multivibrator circuit 324 was set at 150 nanoseconds, and the duration of the pulse output from the one shot multivibrator circuit 326 was set at 150 nanoseconds. Accordingly, the total delay from the input to the delay circuit 321 to the positive going edge of the CP signal is 2600 nanoseconds.

When one of the inputs to the OR gate 320 is high, a memory cycle will be initiated and the signals CYC REQ, EW, and CP will be generated in sequence. A first input to the OR gate 320 is the 5th INEX signal which is generated during scanning of a guest check and at the time that the 5th index mark thereon is sensed. The PRINT PULSE signal is applied through an inverter 327 to the second input of the OR gate 320, such that when the apparatus initially enters the PRINT mode of operation a memory cycle will be initiated. The CLEAR PULSE signal is applied through an inverter 328 to a third input of the OR gate 320, such that when the apparatus initially enters the CLEAR mode a memory cycle will be initiated.

A fourth input to the OR gate 320 is supplied from an output of an AND gate 329 having a first input thereof connected to the output of a NAND gate 330. The B signal is applied to a first input of the NAND gate 330, the LSD FULL signal is applied to a second input thereof, and the MSD FULL signal is applied to a third input thereof. The PRINT signal is applied to a second input of the AND gate 329. The output of an OR gate 331 is connected to the third input of the AND gate 329 and has its first input connected to receive the PR COMP PULSE signal. A second input to the OR gate 331 is supplied from an output of an AND gate 332 having a first input thereof connected to receive the PR COMM PULSE signal and a second input thereof connected to receive the CP signal. Accordingly, a memory cycle is initiated when the apparatus first enters the PRINT mode by virtue of the PRINT PULSE signal and subsequent memory cycles are initiated by the immediately above described circuitry when the apparatus is in the PRINT mode. Such subsequent memory cycles will not be initiated, however, until either the printer 54 has completed a printing operation or a print command signal, PR COMM PULSE signal, is not being generated and a previous memory cycle has completed. In addition, such subsequent memory cycles will terminate as soon as the B section of the memory 46 is enabled and the counters 41 and 42 have attained a maximum count therein.

A fifth input to the OR gate 320 is supplied from the output of a negative OR gate 333 having its first input connected to receive the STORE PULSE signal and its second input connected to the output of a NAND gate 334. The STORE signal is applied to a first input of the NAND gate 334, the B signal is applied to a second input thereof, and the CP signal is applied to a third input thereof. As described in connection with FIG. 22, the STORE PULSE signal, which is inverted to provide the STORE PULSE signal, is generated from the STORE signal and the ACCEPT signal. Accordingly, when a guest check has been accepted and the apparatus is in the STORE mode, a memory cycle will be initiated. Also, when the apparatus is in the STORE mode and the B section of the memory 46 is enabled and a previous memory cycle has been completed, a subsequent memory cycle will be initiated.

A sixth input to the OR gate 320 is provided at an output of an AND gate 326. The CLEAR signal is applied through an inverter 337 to a first input of the AND gate 336 and the CP signal is applied to a second input thereof. Accordingly, when the apparatus initially enters the CLEAR mode of operation, the third input to the OR gate 320 will be high as described above. When the memory cycle initiated by such an input is completed and while the CLEAR signal is still low, subsequent memory cycles will be initiated.

A seventh input to the OR gate 320 is provided at an output of an AND gate 338 having a first input thereof connected to the ERASE signal, a second input thereof connected to the COMPARE signal, a third input thereof connected to the A signal, and a fourth input thereof connected to the CP signal. Accordingly, when the apparatus is in the ERASE mode and a comparison exists as indicated by the high level of the COMPARE signal generated by the circuit illustrated in FIG. 21, the A section of the memroy 46 is enabled, and a memory cycle has been completed, a subsequent memory cycle will be initiated.

An eighth input to the OR gate 320 is supplied from an output of an AND gate 339 having a first input thereof connected to receive the HI signal and a second input thereof connected to receive the CP signal. Accordingly, when the apparatus is in the HI mode and a memory cycle has been completed, a subsequent memory cycle will be initiated.

The gate control circuit 52 and the LSD/MSD gates 43 are illustrated in FIG. 29. As shown therein, a flip-flop circuit 340 generates the LSD GATE signal at an output 341 and the MSD GATE signal on an output 342. Whenever the flip-flop circuit 340 is set by the application of a high level signal to the set input thereof, the LSD GATE signal will be high and the MSD GATE signal will be low. When a high level signal is applied to the reset input of the flip-flop circuit 340, the MSD GATE signal will be high and the LSD GATE signal will be low. The outoput of an OR gate 343 is connected to the set input of the flip-flop circuit 340. The $\overline{LO}$ signal and the 5th INDEX signal are connected to one input of the OR gate 343. Accordingly, when the apparatus is in a mode other than the LO mode and a 5th INDEX signal is generated, the flip-flop 340 will be set to generate a high output on the line 341 in the form of the LSD GATE signal.

The CLEAR $\overline{PULSE}$ signal is connected through an inverter 346 to a second input of the OR gate 343. Accordingly, the flip-flop circuit 340 is also set when the apparatus initially enters CLEAR mode of operation.

The BIT φ signal is applied to the first input of an AND gate 347, the PRINT signal is applied to a second input thereof and the EW signal is applied to a third input thereof. The output of the AND gate 347 is connected to a third input of the OR gate 343. Accordingly, when a 1 information bit is sensed in the first subsection of either the A or B sections of the memory 46, the apparauts is in the PRINT mode, and a memory cycle has been completed, the flip-flop 340 will be set.

The output of an OR gate 348 is connected to the reset input of the flip-flop 340. One input to the OR gate 348 is supplied from the output of an AND gate 349 having the PRINT signal connected to a first input thereof, the EW signal connected to a second input thereof, the LSD FULL signal connected to a third input thereof, and the MSD FULL signal connected through an inverter 350 to the fourth input thereof. Accordingly, if the counter 41 does not contain a maximum count, but the counter 42 does contain a maximum count and the apparatus is in the PRINT mode and a memory cycle has been completed, the flip-flop circuit 340 will be reset.

A second input to the OR gate 348 is provided at an output of an AND gate 351 having its first input connected to the EW signal, second input connected to the STORE signal, its third input connected to the B signal, and its fourth input connected to the BYTE 2 signal. Accordingly, when the apparatus is in the STORE mode of operation and the second, third and fourth subsections of section B of the memory 46 are enabled and a memory cycle has completed, the flip-flop 340 will be reset.

A third input to the OR gate 348 is supplied from an output of an AND gate 352 having its first input connected to the CP signal, its second input connected to the HI signal, and its third input connected to the HI-LO COMPARE signal. Accordingly, the flip-flop circuit 340 will be reset when the apparatus is in the HI mode of operation and a comparison signal, HI-LO COMPARE, is generated by the comparator 49 and a memory cycle has been completed.

The PRINT $\overline{PULSE}$ signal is applied through an inverter 353 to a fourth input of the OR gate 348. Accordingly, the flip-flop circuit 340 will be reset when the apparatus initially enters the PRINT mode of operation. The LO $\overline{PULSE}$ signal is applied through an inverter 354 to the fifth input of the OR gate 348. Accordingly, the flip-flop 340 will be reset when the apparatus initially enters the LO mode of operation.

The LSD GATE and MSD GATE signals are employed for connecting appropriate outputs of the MSD counter 41 or the LSD counter 42 through the BCD-to-binary converter 44 to the memory 46. As shown in FIG. 29, the outputs of the LSD counter 42 and the outputs of the MSD counter 41 are connected to the input terminals 360 of the LSD/MSD gates 43. One output of each of the counter stages 134 and 135 of the counter 42 and one output of each of the counter stages 176 and 177 of the counter 41 are connected to the same gate circuit, a representative one of which is shown in FIG. 29 and includes the AND gates 361 and 362 and the OR gate 363. It will be understood that the other outputs of the counter stages 134 and 135 and the other outputs of the counter stages 176 and 177 are connected to the corresponding gate circuits and, therefore, only the illustrated gate circuit will be described.

As shown in FIG. 29, the LSD GATE signal is connected to a first input of the AND gate 361 and the BCD 1-1 signal is connected to the other input thereof. The MSD GATE signal is connected to a first input of the AND gate 362 and the BCD 4-1 signal is connected to a second input thereof. The output of the AND gate 361 is connected to the first input of the OR gate 363 and the output of the AND gate 362 is connected to the second input thereof. The output of the OR gate 363 is connected to the first input of the BCD-to-binary converter 44. Accordingly, when the LSD GATE signal is high, the information contained in the BCD 1-1, BCD 1-2, BCD 1-4, BCD 1-8, BCD 2-1, BCD 2-2, BCD 2-4, and the BCD 2-8 signals will be supplied to the first eight inputs, respectively, of the converter circuit 44. However, when the MSD GATE signal is high, the information contained in the respective outputs of the counter stages 176 and 177 designated BCD 4-1 to BCD 5-8 will be supplied to the first eight inputs of the converter circuit 44.

The outputs of the counter stage 136 of the counter 42 are each connected to the first input of a respective AND gate, a representative one of which is shown and designated with the reference numeral 363. The LSD GATE signal is connected to the second input of such AND gates, such that when the LSD GATE signal is high, the information at the output of the counter stage 136 is supplied to the remaining four inputs of the converter circuit 44. Outputs 364 of the converter circuit 44 constitutes an address in binary form which is supplied to the memory 46 to address either the first subsection of the A or B sections if the MSD GATE signal is high or to address the second, third and fourth subsections of the A or B sections if the LSD GATE signal is high.

OPERATION

Figure 26:
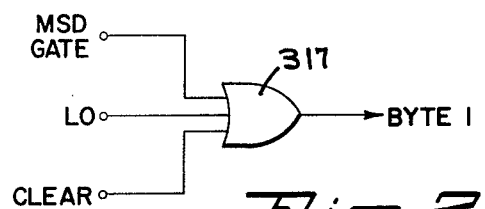
Figure 27:
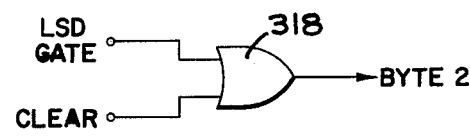

The apparatus is prepared for operation before any information is entered therein by actuating the CLEAR select switch 203 to generate the CLEAR and CLEAR PULSE signals. As shown in FIG. 28, the CLEAR PULSE generates a plurality of memory cycles. As shown in FIGS. 26 and 27, the CLEAR signal generates the BYTE 1 and BYTE 2 signals. As shown in FIG. 25, the CLEAR signal generates the CW signal and the signals BIT φ OUT to BIT 3 OUT supplied to the memory 46 are at a low level. As shown in FIG. 29, the CLEAR PULSE signal sets the flip-flop 340 to enable the LSD GATES. As shown in FIG. 24, the CLEAR PULSE signal resets the flip-flop 300 causing the A signal to go high until the LSD counter 42 has attained a maximum count at which time, the CLEAR signal, the LSD FULL signal, and the CW signal set the flip-flop 300 to cause the B signal to go high. As shown in FIG. 20, if the apparatus is not in the PRINT mode by virtue of the absence of the PR COMM PULSE signal, the CLEAR signal will, at the end of each memory cycle cause the C LSD signal to go to a low level. As also shown therein, the CLEAR signal will cause the C ENBL signal to go to a high level, thereby permitting the counter 42 to be counted with each CP pulse signal. When the LSD FULL signal goes high, as previously mentioned, the B signal will go high and the LSD counter 42 will be counted through its entire count a second time. Accordingly, during the CLEAR mode of operation, all information contained in the memory 46 will be erased.

After the apparatus has been prepared for operation, it is ready to enter the LO mode and receive the guest check of an assigned block of guest checks having the lowest number for storage of the information corresponding thereto. The LO mode of operation is initiated by actuating the switch 200 in FIG. 14 to generate the LO, LO, and LO PULSE signals. As shown in FIG. 25, the LO signal will cause the BIT φ OUT and BIT 1 OUT signals to go high corresponding to a 1. In FIG. 26, the LO signal generates the BYTE 1 signal, but not the BYTE 2 signal, thereby making the BIT 1 OUT signal ineffective. Also in FIG. 25, the LO signal will generate the CW signal. In FIG. 29, the LO PULSE signal will set the flip-flop 340 to generate the MSD GATE signal.

When the guest check containing the lowest number is entered into the transport scanner, a number of functions occur. The 5th INDEX signal, generated during the scanning of a guest check, resets the flip-flop circuit 300 in FIG. 24 to generate the A signal. The C ENBL signal will be low and the C LSD and C MSD signals will be low by virtue of a high output from the AND gate 261 to the OR gates 259 and 260 in FIG. 20. When the INDEX 1 signal is generated under the above conditions, information will be preset into the counter stage 134. When the INDEX 2 and INDEX 3 signals are generated, information will be preset into the counter stages 134 and 135, respectively. Also, when the INDEX 4 and INDEX 5 signals are generated, information will be preset into the counter stages 176 and 177, respectively, under the above mentioned conditions. As shown in FIG. 28, generation of the 5th INDEX signal will initiate a memory cycle.

As shown in FIG. 19, the LO signal and 5th INDEX signal will generate the ACCEPT signal and cause the solenoid 82 to be energized, thereby returning the guest check to the operator. It will be noted that during the LO mode of operation, the LSD counter 42 and the MSD counter 41 are preset with information, but only the information from the MSD counter 41 is supplied to the memory 46, and the information in the LSD counter 42 is retained until the HI mode of operation is initiated. With the generation of the CYC REQ signal, the CW signal, the BYTE 1 signal, the A signal, and the MSD GATE signal, information from the MSD counter 41 will be supplied as an address to the first subsection of section A of the memory 46. With the generation of the BIT φ OUT signal, a 1 will be entered at that address in the first subsection of the A section of the memory 46.

When the HI mode of operation is initiated by actuation of the switch 201, the HI and HI signals are generated and the latch 206 is reset. The HI signal generates the BIT 1 OUT signal and the CW signal, and it enables the AND gates 313 and 314 in FIG. 25 to permit the information in the signals BCD 4-1 and BCD 5-1 to be generated at the respective outputs thereof in the form of the signals BIT 2 OUT and BIT 3 OUT.

When a guest check is entered in the HI mode, the flip-flop 340 in FIG. 29 is set by the 5th INDEX signal to generate the LSD GATE signal. The LSD GATE signal enables appropriate ones of the gates 43 and generates the BYTE 2 signal. The 5th INDEX signal also initiates a memory cycle, such that the information corresponding to the lowest numbered guest check stored in the LSD counter 42 is entered into the memory 46 in the second, third and fourth subsections of section A thereof. In this connection, it will be noted that the 5th INDEX signal also resets the flip-flop circuit 300 in FIG. 24 to generate the A signal.

In the HI mode and upon the generation of the LOAD CL signal, the Hi register 48 is enabled to receive information therein corresponding to the three least significant digits of the guest check being scanned. The generation of these signals also generates the ACCEPT signal by the circuit illustrated in FIG. 22. By virtue of the circuit illustrated in FIG. 20, until the HI-LO COMPARE signal is high, the C LSD signal will be low and the C ENBL signal will be high upon the occurence of each CP signal at the end of each memory cycle to count the counter 42 until the HI-LO COMPARE signal goes high. During such a count, if the LSD counter 42 attains a maximum count therein, a count of 1 will be added to the MSD counter 41 by virtue of the circuit illustrated in FIG. 20. When the HI-LO COMPARE signal goes high, the MSD GATE signal will go high by virtue of the circuit illustrated in FIG. 9 to enable the appropriate ones of the gates 43. The MSD GATE signal generates the BYTE 1 signal to permit the information contained in the MSD counter 41 to be entered into the memory 46.

After the lowest numbered guest check and the highest numbered guest check have been entered, the apparatus enters the ERASE mode. During the ERASE mode, when a guest check is scanned, the information corresponding to the number printed thereon is entered into the MSD counter 41 and the LSD counter 42. If the number thereon is stored, the information corresponding thereto is removed from the memory 46. However, only the three least significant digits are removed from memory. However, if that number is not stored the guest check is not accepted or returned to the operator but is trapped within the compartment 83 (FIG. 3). During the ERASE mode, if the switch 204 is actuated to generate the STORE and the $\overline{\text{STORE}}$ signals, the B signal will be generated and the information contained in the A section corresponding to the scanned number will be erased and transferred to the B section of memory 46.

During the PRINT mode of operation, which is initiated by actuation of the switch 202, a memory cycle is initiated and the MSD counter 41 and the LSD counter 42 are reset by the PRINT PULSE signal. Starting with the lowest address in the memory 46, the memory 46 is addressed sequentially until an address containing a 1 information bit therein has been sensed. When such an information bit is sensed in the first subsection of section A of the memory 46, the second, third and fourth subsections are addressed sequentially until a 1 information bit is found therein. If the information contained therein corresponds with the information in the first subsection and the COMPARE signal is generated, the printer 54 is actuated to print the number corresponding to those addresses. When the printer has completed its printing operation for that particular number, the process continues until a maximum count has been achieved, first in the MSD counter 41 and then in the LSD counter 42. When the A section of the memory 46 has been interrogated, the B section of the memory 46 is interrogated in the same manner.

The memory 46 discussed in the preceding can be either core memory or a semiconductor memory. A suitable core memory can be obtained from Fabri-Teck and a suitable semiconductor memory can be obtained from Intel Corp., particularly such a memory which is identified as Intel IN26.

The optical scanner discussed hereinabove can be employed to scan a variety of printed documents to provide appropriate outputs from the sensors 99. The circuit illustrated in FIG. 11 is associated with the optical scanner to provide BCD information at an output of the converter 111 and appropriate enabling and indexing signals at the output of the index counter 37. Although the outputs from the circuit illustrated in FIG. 11 are employed in the above described embodiment of the present invention to drive counter stages, it can be readily appreciated that such outputs can be employed for driving registers so that the information can be employed in subsequent circuitry after it is initially stored in such registers.

We claim:
1. Apparatus for auditing documents which are sequentially numbered, comprising:
   a. sensing means for sensing numeric information from each of such documents,
   b. first means responsive to said sensing means for storing the numeric information corresponding to the lowest numbered of such documents,
   c. second means responsive to said sensing means for storing the numeric information corresponding to the highest numbered of such documents,
   d. means for comparing the information in said first storing means with the information in said second storing means,
   e. means responsive to said comparing means for adding sequentially a count of "1" to the numeric information contained in said first storing means for providing numeric information representative of a sequence of numbers between the lowest numbered of such documents and the highest numbered of such documents,
   f. a memory, and
   g. means for entering the numeric information provided by said first storing means into said memory.

2. Apparatus for auditing documents as defined in claim 1, further comprising means responsive to said sensing means for removing numeric information from said memory corresponding to a particular one of such documents which is sensed by said sensing means.

3. Apparatus for auditing documents as defined in claim 2, wherein said sensing means includes an optical of the scanner disposed for sensing the horizontal segments of the indicia of a numeral in block form.

4. Apparatus for auditing documents as defined in claim 3, wherein said scanner includes a source of illumination, means for transmitting light from said source to a plurality of discrete positions located in a plane, a plurality of photosensors, means for transmitting light from each of said discrete positions to said sensors, and a mask mounted in said plane and including a plurality of apertures each located in a corresponding one of said discrete positions, with each of said discrete positions corresponding to one half of a respective horizontal segment of the indicia of a numeral in block form.

5. Apparatus for auditing documents as defined in claim 4, wherein said mask of said scanner further includes an index aperture located at one of said discrete positions and positioned outside an area which circumscribes the plurality of apertures.

6. Apparatus for auditing documents as defined in claim 5, wherein said scanner further comprises means responsive to each of said photosensors associated with said plurality of apertures and providing an output when the level of illumination on each of such photosensors is within prescribed limits, and means responsive to one of said photosensors associated with said index aperture for enabling said output when the level of illumination thereon is within said prescribed limits.

7. Apparatus for auditing documents as defined in claim 6, wherein said plurality of apertures positioned in three rows and two columns, such that each aperture of said plurality of apertures senses one half a horizontal segment of the indicia of a numeral in block form, said index aperture is aligned midway between said columns.

8. Apparatus for auditing documents as defined in claim 1, wherein said first storing means includes a presetable counter having a plurality of stages, each of said stages being disposed for receiving information corresponding to only one digit of the numeric information on each of such documents, said memory including a first section having addresses corresponding to at least the most significant digit of the numeric information and a second section having addresses corresponding to at least the least significant digit of the numeric information, said entering means including means for addressing said first section in accordance with information contained in at least a first of said stages and for addressing said second section in accordance with information contained in at least a second of said stages, said entering means further including means for entering a bit of information at the addresses corresponding to the information contained in said counter.

9. Apparatus for auditing documents as defined in claim 8, wherein said entering means is responsive to said adding means for entering a binary 1 at the addresses corresponding to the information contained in said counter and is responsive to said sensing means for entering a binary 0 at the addresses corresponding to the information contained in said counter.

10. Apparatus for auditing documents as defined in claim 9, further comprising means for displaying the addresses in said memory which contain a binary 1.

11. Apparatus for auditing documents which are sequentially numbered, comprising:
   a. means for selecting and enabling one of a plurality of modes,
   b. means responsive to said selecting means for sensing numeric information from each of such documents,
   c. first means responsive to a first of said modes and to said sensing means for storing numeric information corresponding to the lowest numbered of such documents,
   d. second means responsive to a second of said modes and to said sensing means for storing numeric information corresponding to the highest numbered of such documents,
   e. means for comparing the information in said first storing means with the information in said second storing means,
   f. means responsive to said second mode and to said comparing means for sequentially adding a count of 1 to the numeric information contained in said first storing means for providing numeric information representative of a sequence of numbers between the lowest numbered of such documents and the highest numbered of such documents,
   g. a memory having a plurality of addresses each corresponding to the numeric information on a respective one of such documents, and
   h. means for sequentially entering a binary 1 into said memory at an address corresponding to the information provided by said first storing means.

12. Apparatus for auditing documents as defined in claim 11, wherein said memory includes a pair of memory sections, and means responsive to a third of said modes and to said sensing means for transferring information from a first of said sections to the second of said sections.

13. Apparatus for auditing documents as defined in claim 11, wherein said memory includes a pair of memory sections, said first storing means includes at least a pair of storage stages, and said entering means being disposed for entering a binary 1 at an address in a first of said memory sections corresponding to the information in a first of said memory sections corresponding to the information in the second of said storage stages.

14. Apparatus for auditing documents as defined in claim 11, wherein said entering means includes means responsive to a third of said modes and to said sensing means for entering a binary 0 onto one of the addresses containing a binary 1, which address corresponds to the information in said first storing means.

15. Apparatus for auditing documents as defined in claim 14, wherein said memory includes a pair of memory sections, and means responsive to said third mode and to said entering means for entering a binary 0 at a selected address in a first of said memory sections and a binary 1 at said selected address in the second of said memory sections, which selected address corresponds to the information in said first storing means.

16. Apparatus for auditing business records which are sequentially identifiable, comprising:
   a. sensing means for sensing identifiable information from each of such business records,
   b. first means responsive to said sensing means for storing the identifiable information corresponding to one limit of such business records,
   c. second means responsive to said sensing means for storing identifiable information corresponding to another limit of such business records,
   d. a memory,
   e. means for entering into said memory identifiable information representing a sequential series of identification data within said limits sensed by said first and second means, and
   f. means responsive to said sensing means for removing from said memory identifiable information within said limits corresponding to a particular one of such business records within said limits sensed by said sensing device.

* * * * *